United States Patent [19]
Hoshino et al.

[11] Patent Number: 5,742,571
[45] Date of Patent: Apr. 21, 1998

[54] DISK RECORDING AND/OR REPRODUCING APPARATUS

[75] Inventors: Masaaki Hoshino, Tokyo; Takashi Koya, Kanagawa, both of Japan

[73] Assignee: Sony Corporation, Tokyo, Japan

[21] Appl. No.: 662,487

[22] Filed: Jun. 13, 1996

Related U.S. Application Data

[63] Continuation of Ser. No. 318,749, PCT/JP94/00355 filed Mar. 7, 1994 published as WO94/20959 Sep. 15, 1994, abandoned.

[30]    Foreign Application Priority Data

| Mar. 5, 1993 | [JP] | Japan | 5-045336 |
| Mar. 2, 1994 | [JP] | Japan | 6-032641 |

[51] Int. Cl.$^6$ .............................. G11B 17/22; G11B 17/26
[52] U.S. Cl. ............................................ 369/37; 369/75.2
[58] Field of Search .............................. 369/36, 37, 75.1, 369/75.2, 77.1, 77.2

[56]    References Cited

U.S. PATENT DOCUMENTS

| 4,670,802 | 6/1987 | Ogawa et al. ................. 369/77.2 X |
| 4,697,259 | 9/1987 | Takanashi ..................... 369/75.2 |
| 4,755,978 | 7/1988 | Takizawa et al. ............. 369/37 |
| 5,115,419 | 5/1992 | Akiyama et al. .............. 369/37 |
| 5,123,005 | 6/1992 | Kurosu ......................... 369/77.1 |
| 5,172,361 | 12/1992 | Urushibata et al. ........... 369/77.1 |
| 5,197,056 | 3/1993 | Van Heusden et al. ........ 369/37 |
| 5,218,593 | 6/1993 | Kaneo et al. .................. 369/77.1 |
| 5,251,195 | 10/1993 | Kawakami et al. ............ 369/75.2 |
| 5,293,362 | 3/1994 | Sakurai et al. ................ 369/30 |
| 5,386,403 | 1/1995 | Morioka et al. .............. 369/37 |
| 5,513,157 | 4/1996 | Saito et al. .................... 369/34 |

FOREIGN PATENT DOCUMENTS

| 62-257667 | 11/1987 | Japan . |
| 3-88170 | 4/1991 | Japan . |
| 04-2356 | 1/1992 | Japan . |

Primary Examiner—Stuart S. Levy
Assistant Examiner—William J. Klimowicz
Attorney, Agent, or Firm—Jay H. Maioli

[57]    ABSTRACT

A tray supported by the apparatus body housing the disk rotating mechanism so as to be able to be moved between the position projected from the apparatus body and the housing position in the apparatus body through the opening portion provided through the apparatus body, the turntable which is rotatably fitted to the tray and has a plurality of housing portions for housing a plurality of discs along the periphery thereof, the first operating mechanism for permitting the disk rotating mechanism to chuck the disk in a ganged relation with the movement of the tray between the projected position and the housing position, and the second operating mechanism which moves the tray between the projected position and the housing position when the disk rotating mechanism is chucking the disk. Therefore, the operation for chucking the disk can be performed in a ganged relation with insertion and ejection of the tray, and the tray is inserted and ejected during reproduction of the disk chucked by the disk rotating mechanism.

21 Claims, 17 Drawing Sheets

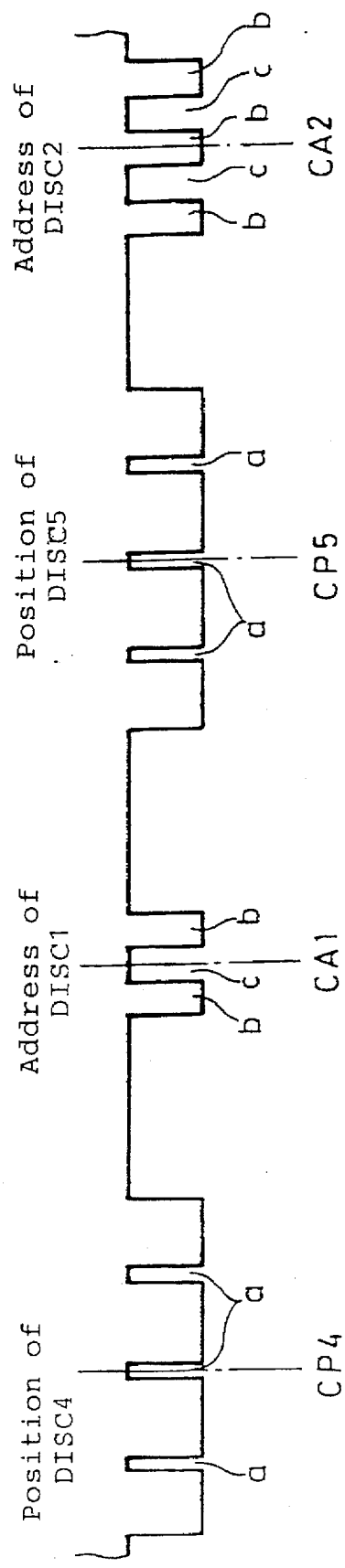

DISK RECORDING AND/OR REPRODUCING APPARATUS

This is a continuation of application Ser. No. 08/318,749, filed as PCT/JP94/00355 Mar. 7, 1994 published as WO94/20959 Sep. 15, 1994, now abandoned.

TECHNICAL FIELD

The present invention relates to a disk recording and/or reproducing apparatus and particularly to a disk recording and/or reproducing apparatus which selectively chucks a plurality of discs housed in a turntable and can record and/or reproduce an information signal on and/or from an optional position of an optional disk.

BACKGROUND ART

There has been generally proposed a disk recording and/or reproducing apparatus for recording and/or reproducing an information signal on and/or from a recording disk such as an optical disk, a magnetic disk, a magneto-optical disk or the like. Such disk recording and/or reproducing apparatus is composed of a disk rotating mechanism for holding and rotating the above-mentioned recording disk and a pickup apparatus which writes and/or reads the information signal on and/or from the recording disk while being opposed to the above-mentioned recording disk rotated by the disk rotating mechanism. If the above-mentioned recording disk is an optical disk, then an optical pickup apparatus is employed as the above-mentioned pickup apparatus.

In addition to the above-mentioned disk recording and/or reproducing apparatus, there has been conventionally proposed one arranged such that many kinds of recording discs having different diameters can be loaded thereonto and the information signal can be recorded and/or reproduced by using these recording discs selectively. Of the many kinds of the recording discs having different diameters capable of being loaded onto such disk recording and/or reproducing apparatus, there are an optical audio disk having a large diameter (a diameter of 12 cm), an optical audio disk having a small diameter (a diameter of 8 cm) and so on. The disk recording and/or reproducing apparatus is provided with a tray for positioning and housing the many kinds of recording discs.

The tray has a turntable which can be rotated. On an upper surface portion of the turntable, housing portions formed of a plurality of circular concave portions for positioning the many respective recording discs are formed by being arranged in the peripheral direction thereof. That is, on the upper surface portion of the turntable, a plurality of large-diameter housing portions corresponding to the optical audio disk having the large diameter and small-diameter housing portions which correspond to the optical audio disk having the small diameter and are provided on bottom surface portions of the respective large-diameter housing portions are both concentrically formed by using a rotation center axis of the turntable as their common center. Through the above-mentioned turntable, long-aperture-shaped opening portions each used for positioning an opposing optical pickup apparatus and a disk table to the recording disk positioned by the disk positioning portion are formed so as to correspond to bottom surface portions of the above-mentioned respective large-diameter housing portions and small-diameter housing portions.

Therefore, in the tray, when the turntable is rotated, the respective large-diameter housing portions and small-diameter housing portions are rotated together with the turntable and moved around the rotation center axis of the turntable by describing an arc-shaped locus. In the disk recording and/or reproducing apparatus, there is disposed the disk table for chucking and rotating the optical audio disk at a center position of each of the large-diameter housing portion and the small-diameter housing portion.

When the optical audio disk having the large diameter or the small diameter is reproduced in the disk recording and/or reproducing apparatus having such construction, the optical audio disk is first inserted into the above-mentioned large-diameter housing portion or small-diameter housing portion and positioned. Next, the turntable is rotated to thereby carry the optical audio disk to a position corresponding to the disk table. Therefore, the above-mentioned disk table chucks and rotates the optical audio disk. Therefore, reproduction such as a musical performance or the like can be performed.

However, in the conventional disk recording and/or reproducing apparatus as described above, there is usually employed a three-motor loading system using three motors; a motor for inserting and ejecting the tray into and from an apparatus body, a motor for rotating the turntable, and a motor for lifting and lowering the optical pickup apparatus. Therefore, a motor controlling system becomes complicated, so that operational efficiency after assembly of the apparatus is aggravated and in addition the apparatus becomes expensive to the extent that the number of motors to be used is large, which is uneconomical.

In the conventional disk recording and/or reproducing apparatus, there is also proposed a two-motor loading system in which one motor makes it possible to insert and eject the tray and to lift and lower the optical pickup apparatus. However, since both the insertion and ejection of the tray and the lifting and lowering of the optical pickup apparatus are performed with one driving gear and the optical pickup apparatus is lifted and lowered with a part of the driving gear in such two-motor loading system, there is then the problem that an unnecessary vibration is sometimes given to the optical pickup apparatus during reproduction of the recording disk and hence sound quality is lowered.

DISCLOSURE OF THE INVENTION

The present invention is made in consideration of such problems, and an object thereof is to provide a disk recording and/or reproducing apparatus in which an effect substantially similar to the conventional case where the three motors are used can be obtained with two motors, the structure of a motor controlling system can be simplified, the production costs can be reduced by improvement of operational efficiency upon assembly thereof, and fear of giving an unnecessary vibration to a pickup apparatus during reproduction is avoided.

According to a first invention, there are provided a tray supported by an apparatus body so as to be able to be moved between a position projected from the apparatus body and a housing position in the apparatus body through an opening portion provided through the apparatus body housing a disk rotating mechanism, a turntable which is rotatably fitted to the tray and has a plurality of housing portions for housing a plurality of discs along a periphery thereof, a first operating mechanism for permitting the disk rotating mechanism to chuck the disk in a ganged relation with movement of the tray between the projected position and the housing position, and a second operating mechanism which moves the tray between the projected position and the housing position in such a state that the disk rotating mechanism is chucking the disk. Therefore, the disk can be chucked in a ganged relation with insertion and ejection of the tray, and the tray is inserted and ejected during reproduction of a chucked disk, so that the discs except the chucked disk can be safely and reliably exchanged.

According to a second invention, the first operating mechanism and the second operating mechanism are respectively formed of a first gear train and a second gear train which are driven by a single driving source and the first gear train and the second gear train are switched in drive by a switching operation of the single driving source. Therefore, the first gear train and the second gear train are switched by the single driving source, and ordinary loading and loading during reproduction can be selectively performed and the first operating mechanism and the second operating mechanism can be realized with a simple construction.

According to a third invention, the first operating mechanism includes a main gear rotated by the single driving source and a lifting and lowering member driven by the main gear for lifting and lowering a disk driving unit of the disk rotating mechanism relative to a gripping portion of the disk rotating mechanism. Further, this apparatus is provided with a rotation stopping mechanism for stopping rotation of the lifting and lowering member after the disk driving unit reaches a position where it is to be lowered. Therefore, action of the lifting and lowering member allows the disk to be reliably loaded and unloaded by the disk rotating mechanism, and after the disk driving unit is lowered, the lifting and lowering member is fixed, whereby vibration from the main gear can be prevented from being transmitted to the side of the disk rotating mechanism.

According to a fourth invention, the first operating mechanism includes the main gear rotated by the single driving source and the lifting and lowering member driven by the main gear for lifting and lowering the disk driving unit of the disk rotating mechanism relative to the gripping portion of the disk rotating mechanism. Further, this apparatus is provided with the rotation stopping mechanism for stopping rotation of the lifting and lowering member during operation of the second operating mechanism. Therefore, action of the lifting and lowering member allows the disk to be reliably loaded and unloaded by the disk rotating mechanism, and the lifting and lowering member is fixed during movement of the tray upon chucking the disk, whereby the vibration from the main gear can be prevented from being transmitted to the side of the disk rotating mechanism.

According to a fifth invention, the second operating mechanism includes a reverse gear driven by the main gear for inserting and ejecting the tray. The reverse gear is provided with a rack-side gear for engagement with a rack portion provided on the tray and an input-side gear for engagement with a reverse-side gear provided on the main gear, wherein an angle of a tooth of the rack-side gear and an angle of a tooth of the input-side gear are set equal to each other. Therefore, the tray can be moved between the projected position and the housing position by the reverse gear, and the reverse gear can be assembled in an optional position, so that assembly efficiency can be improved.

According to a sixth invention, this apparatus is further provided with a locking mechanism which prevents the tray located in the projected position from being moved by the second operating mechanism to the housing position when the disk is brought in a chucked state by the disk rotating mechanism and the housing portion for housing the disk chucked by the disk rotating mechanism is rotated and changed in position from a regular position. Therefore, the locking mechanism prevents the tray from being moved to the housing position to prevent the loading upon change of the disk during reproduction, and the turntable or the like is prevented from being brought in contact with the disk rotating mechanism or the like.

According to a seventh invention, the locking mechanism includes the main gear rotated by the single driving source and a locking lever rocked by the main gear for engagement with the tray. Therefore, the locking mechanism can have a simple structure, and the tray can be reliably prevented from movement.

According to an eighth invention, there are provided a disk recording and/or reproducing unit, the tray supported by the apparatus body housing the disk recording and/or reproducing unit so as to be able to be moved between the position projected from the apparatus body and the housing position in the apparatus body through the opening portion provided through the apparatus body, the turntable of which is rotatably fitted to the tray and has a plurality of housing portions for housing a plurality of discs along the periphery thereof, the lifting and lowering unit for lifting and lowering the disk recording and/or reproducing unit between a lifted position where an information signal is recorded or reproduced thereby on or from a carried disk and a lowered position where the disk recording and/or reproducing unit is located while the disk is being carried by the tray, and a table locking mechanism which restricts rotation of the turntable when the disk recording and/or reproducing unit is brought by the lifting and lowering unit to the lifted position. Therefore, rotation of the turntable upon chucking the disk is restricted by the table locking mechanism, so that the turntable is prevented from being brought in contact with the disk recording and/or reproducing unit or the like.

According to a ninth invention, the table locking mechanism includes a projected engaging portion provided in either the turntable or the disk recording and/or reproducing unit and a concave engaging portion provided in the other section thereof. Therefore, the table locking mechanism can be made so as to have a simple structure, and rotation of the turntable can be reliably restricted.

According to a tenth invention, there are provided the disk recording and/or reproducing unit having a pickup provided so that it can be moved in the radius direction of the disk, the tray supported by the apparatus body housing the disk recording and/or reproducing unit so as to be able to be moved between the position projected from the apparatus body and the housing position in the apparatus body through the opening portion provided through the apparatus body, the turntable of which is rotatably fitted to the tray and has a plurality of housing portions for housing a plurality of discs along the periphery thereof, a driving mechanism for moving the tray between the projected position and the housing position, and the lifting and lowering unit for lifting and lowering the disk recording and/or reproducing unit between the lifted position where the information signal is recorded or reproduced by the pickup on or from the carried disk and the lowered position where the disk recording and/or reproducing unit is located while the disk is being carried by the tray. It is arranged such that the disk recording and/or reproducing unit is disposed at a position which is biased from a movement locus of a rotation center of the turntable in the apparatus body. Therefore, since the turntable is disc-shaped, a distance from a rear end of the tray to the housing portion opposed to the disk recording and/or reproducing unit can be made long, and since the disk recording and/or reproducing unit can be relatively set at the front side of the apparatus body to that extent, the tray can be deeply inserted into the apparatus body, so that the whole of the present apparatus can be downsized.

According to an eleventh invention, at the rear side of the tray, there is formed a notch portion which is so large that the pickup can be moved in the radius direction of the disk. Therefore, the tray can be more deeply inserted into the apparatus body.

According to a twelfth invention, each of a plurality of housing portions of the turntable is formed at a position which is radially located relative to the rotation center of the turntable, a notch portion is formed along the movement locus in the disk radius direction of the pickup in each of the housing portions, and the notch portion is formed so that a longitudinal direction of the notch portion should be inclined at a predetermined angle relative to a radial line whose center is the rotation center of the turntable. Therefore, there can be obtained the turntable suitable for use in an apparatus in which the disk recording and/or reproducing unit is provided at the position biased from the movement locus of the rotation center of the turntable.

According to a thirteenth invention, the notch portion is formed so as to be positioned outwardly from a center of the housing portion, and an outer side of the notch portion is made so as to be an open end. Therefore, the disk recording and/or reproducing unit can be relatively moved in the forward and backward directions of the apparatus body relative to the notch portion of the rotatable turntable.

According to a fourteenth invention, of a plurality of housing portions of the turntable, the longitudinal direction of the notch portion of the housing portion positioned so as to be opposed to the disk recording and/or reproducing unit is aligned with a longitudinal direction of the notch portion of the tray. Therefore, the disk recording and/or reproducing unit can be relatively moved in the forward and backward directions of the apparatus body relative to the notch portion of the tray and the notch portion of the turn table rotatably housed therein.

According to a fifteen invention, each of a plurality of housing portions of the turntable is formed at the position radially located relative to the rotation center of the turntable, the notch portion is formed along the movement locus in the disk radius direction of the pickup in each of the housing portions, and the notch portion is formed so that the longitudinal direction of the notch portion should be in parallel to a moving direction of the tray between the projected position and the housing position when the tray is located at the housing position. Therefore, the tray and the turntable can be inserted into and ejected from the apparatus body and the turntable rotatably supported by the tray can be rotated while the notch portion of the turntable prevents the disk rotating mechanism housed in the apparatus body from being brought in contact with the turntable.

According to a sixteenth invention, the notch portion is formed so as to be positioned outwardly from the center of the housing portion, and the outer side of the notch portion is made so as to be the open end. Therefore, the disk recording and/or reproducing unit can be moved from the outside of the tray and the turntable to the center portion of the disk housing portions along the respective notch portions.

According to a seventeenth invention, of a plurality of housing portions of the turntable, the longitudinal direction of the notch portion of the housing portion positioned so as to be opposed to the disk recording and/or reproducing unit is aligned with the longitudinal direction of the notch portion of the tray. Therefore, the tray and the turntable can be inserted into and ejected from the apparatus body and the turntable rotatably supported by the tray can be rotated while the notch portion of the tray and the notch portion of the turntable prevent the disk rotating mechanism housed in the apparatus body from being brought in contact therewith.

According to an eighteenth invention, there are provided the disk recording and/or reproducing unit having the pickup provided so that it can be moved in the radius direction of the disk, the tray supported by the apparatus body so as to be able to be moved between the position projected from the apparatus body and the housing position in the apparatus body through the opening portion provided through the apparatus body housing the disk recording and/or reproducing unit, the turntable which is rotatably fitted to the tray and has a plurality of housing portions for housing a plurality of discs along the periphery thereof, the lifting and lowering member for lifting and lowering the disk recording and/or reproducing unit between the lifted position where the information signal is recorded or reproduced by the pickup on or from the carried disk and the lowered position where the disk recording and/or reproducing unit is located while the disk is being carried by the tray, a rotating member for moving the tray between the projected position and the housing position and driving the lifting and lowering member and locking the tray at the housing position, a first motor provided in the apparatus body for rotating the rotating member, and a second motor provided on the tray for rotating the turntable. Therefore, the ordinary loading and the loading during reproduction can be reliably and safely performed by using two motors.

According to a nineteenth invention, the rotating member includes a first driving unit for moving the tray between the projected position and the housing position, a second driving unit for driving the lifting and lowering member, and a locking unit for locking the tray at the housing position. Therefore, action of the rotating member permits the tray to be moved between the projected position and the housing position, permits the lifting and lowering member to be driven, and permits the tray to be locked at the housing position.

According to a twentieth invention, there are provided the disk recording and/or reproducing unit having the pickup provided so that it can be moved in the radius direction of the disk, the tray supported by the apparatus body housing the disk recording and/or reproducing unit so as to be able to be moved between the position projected from the apparatus body and the housing position in the apparatus body through the opening portion provided through the apparatus body, the turntable which is rotatably fitted to the tray and has a plurality of housing portions for housing a plurality of discs along the periphery thereof, the lifting and lowering member for lifting and lowering the disk recording and/or reproducing unit between the lifted position where the information signal is recorded or reproduced by the pickup on or from the carried disk and the lowered position where the disk recording and/or reproducing unit is located while the disk is being carried by the tray, and a rotating member for moving the tray from the housing position to the projected position by rotation in a first direction and from the projected position to the housing position by rotation in a second direction and driving the lifting and lowering member. It is arranged that when a command to move the tray from the housing position to the projected position is issued during the recording and/or reproduction of the information signal on and/or from the disk by the pickup, the rotating member is rotated in the second direction to thereby move the tray in the direction to the projected position. Therefore, when the command to move the tray from the housing position to the projected position is issued during the recording and/or reproduction of the information signal on and/or from the disk by the pickup, the tray is moved in the direction to the projected position while the rotating member is being rotated in the second direction, whereby operation to exchange another disk can be safely and reliably performed even during reproduction.

According to a twenty-first invention, the apparatus is further provided with the reverse gear engaged with the rotating member upon rotation thereof in the second direction, and rotation of the reverse gear permits the tray to be moved to the projected position. Therefore, a torque of the rotating member is transmitted to the reverse gear, whereby the tray can be moved to the projected direction through operation of the reverse gear.

According to a twenty-second invention, there are provided the disk recording and/or reproducing unit having the pickup provided so that it can be moved in the radius direction of the disk, the tray supported by the apparatus body housing the disk recording and/or reproducing unit so as to be able to be moved between the position projected from the apparatus body and the housing position in the apparatus body through the opening portion provided through the apparatus body, the turntable which is rotatably fitted to the tray and has a plurality of housing portions for housing n pieces (where n is an odd number equal to or larger than 3) of discs along the periphery thereof, a detecting means for detecting positions of n pieces of housing portions formed in the turntable, the driving mechanism for moving the tray between the projected position and the housing position, and the lifting and lowering unit for lifting and lowering the disk recording and/or reproducing unit between the lifted position where the information signal is recorded or reproduced by the pickup on or from the carried disk and the lowered position where the disk recording and/or reproducing unit is located while the disk is being carried by the tray. It is arranged that the detecting means is formed in the turntable and consists of first detected portions used for detecting n pieces of housing portions, second detected portions used for detecting positions between the adjacent housing portions and a detecting unit for detecting the first detected portion and the second detected portion and the disk recording and/or reproducing unit is disposed at the position biased from the movement locus of the rotation center of the turntable in the apparatus body. Therefore, the detecting unit detects the first detected portion to thereby enable the positions of n pieces of housing portions to be detected and, in addition to this, the detecting unit detects the second detected portion to thereby enable n pieces of positions other than those of n pieces of housing portions to be detected, so that there can be obtained the disk recording and/or reproducing unit having resolving power which is twice as much as the number of the housing portions.

According to a twenty-third invention, a resolving power of the first detected portion is made higher than that of the second detected portion. Therefore, a position for which high accuracy is required can be detected with high accuracy, and a position for which high accuracy is not required can be detected with lower accuracy.

According to a twenty-fourth invention, the first detected portion is provided at a position corresponding to each of the housing portions and the second detected portion is provided between the adjacent first detected portions. The first detected portions and the second detected portions are alternately provided. Therefore, the single detecting unit can continuously detect the first detected portions and the second detected portions which are alternately repeated, so that the number of the detecting units can be reduced to thereby simplify construction of the detecting means.

According to a twenty-fifth invention, this apparatus is arranged such that the turntable is rotated by a predetermined angle on the basis of a detection output from the detecting unit which detected the second detected portion of the turntable upon movement of the tray to the projected portion. Therefore, the turntable is rotated by a predetermined angle on the basis of the detection output of the second detected portion upon movement of the tray to the projected portion, whereby it becomes possible to house the disk in an optional housing portion, to exchange a previously housed disk, or the like.

BRIEF DESCRIPTION OF DRAWINGS

FIG. 21 is an explanatory diagram showing the other part of the address region and the number region shown in FIG. 19. /

A first embodiment of the present invention will hereinafter be explained with reference to FIGS. 1 to 21.

The present embodiment is constructed by applying the disk recording and/or reproducing apparatus according to the present invention to an apparatus for reproducing an optical audio disk which shows one concrete example of a recording disk.

Figure 1:
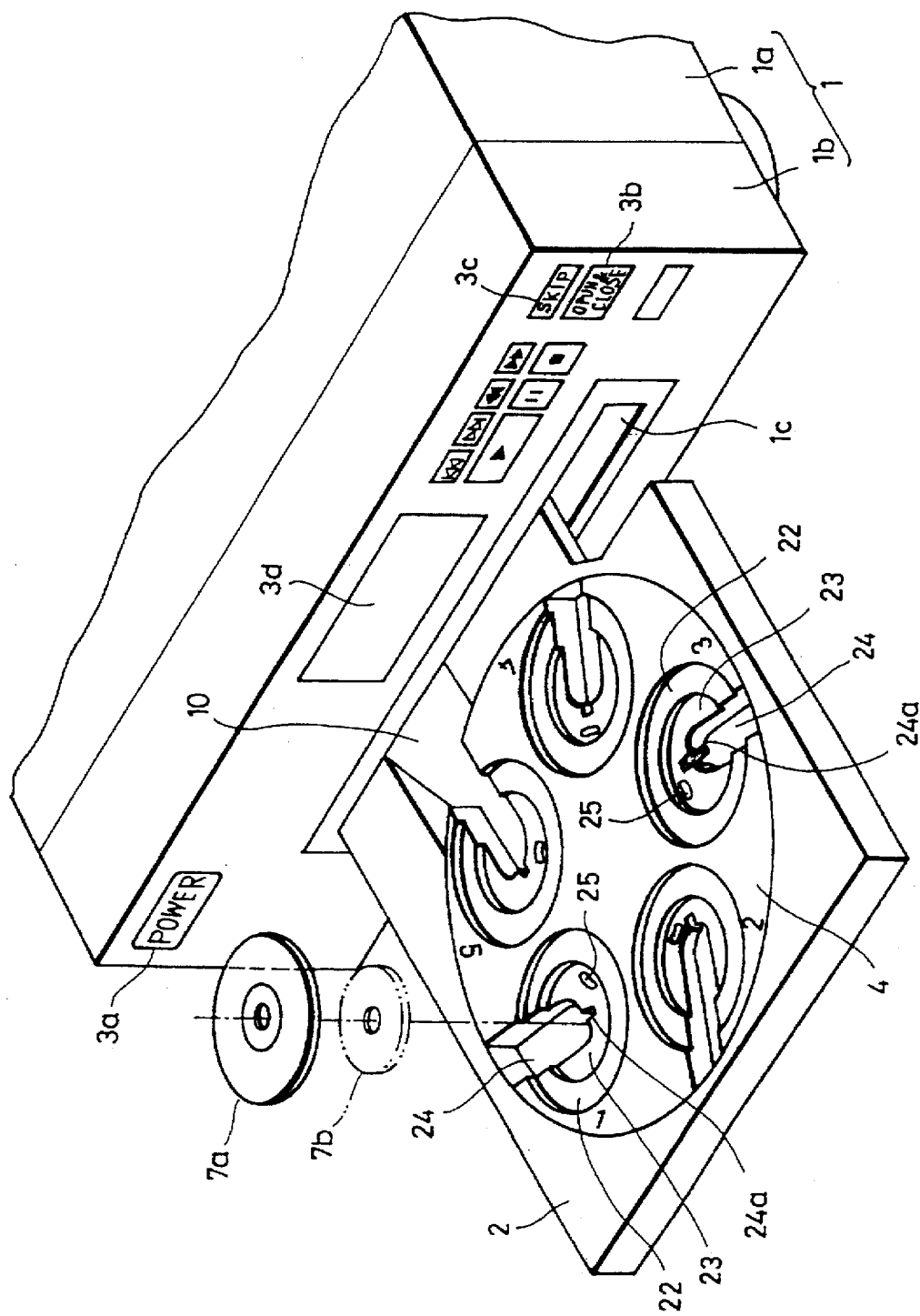
FIG. 1 is a perspective view showing one embodiment of the present invention and showing a state in which a tray and a turntable are drawn from an apparatus body.

As shown in FIG. 1 and the following figures, the disk recording and/or reproducing apparatus is provided with an apparatus body 1. The apparatus body 1 includes a box body 1a having a box shape with an opening at a front side thereof and a front panel 1b used for shutting the front opening of the box body 1a, and a laterally long opening portion 1c is formed through a substantial center portion of the front panel 1b. A tray 2 having a shape of a substantially quadrangular plane plate is fitted through the opening portion 1c of the front panel 1b, and the tray 2 is supported by the apparatus body 1 so that it can be freely moved between a position projected from the apparatus body 1 and a housing position in the apparatus body 1. Through the front panel 1b of the apparatus body 1, a power-source button 3a for switching a power supplied from an external power source on and off, an operation button 3b for inserting and ejecting the tray 2, a skip button 3c for rotating a turntable 4 rotatably held by the tray 2, and push buttons are exposed so as to be capable of being operated. Reference numeral 3d represents a display window for displaying an input state, a play state or the like.

Figure 3:
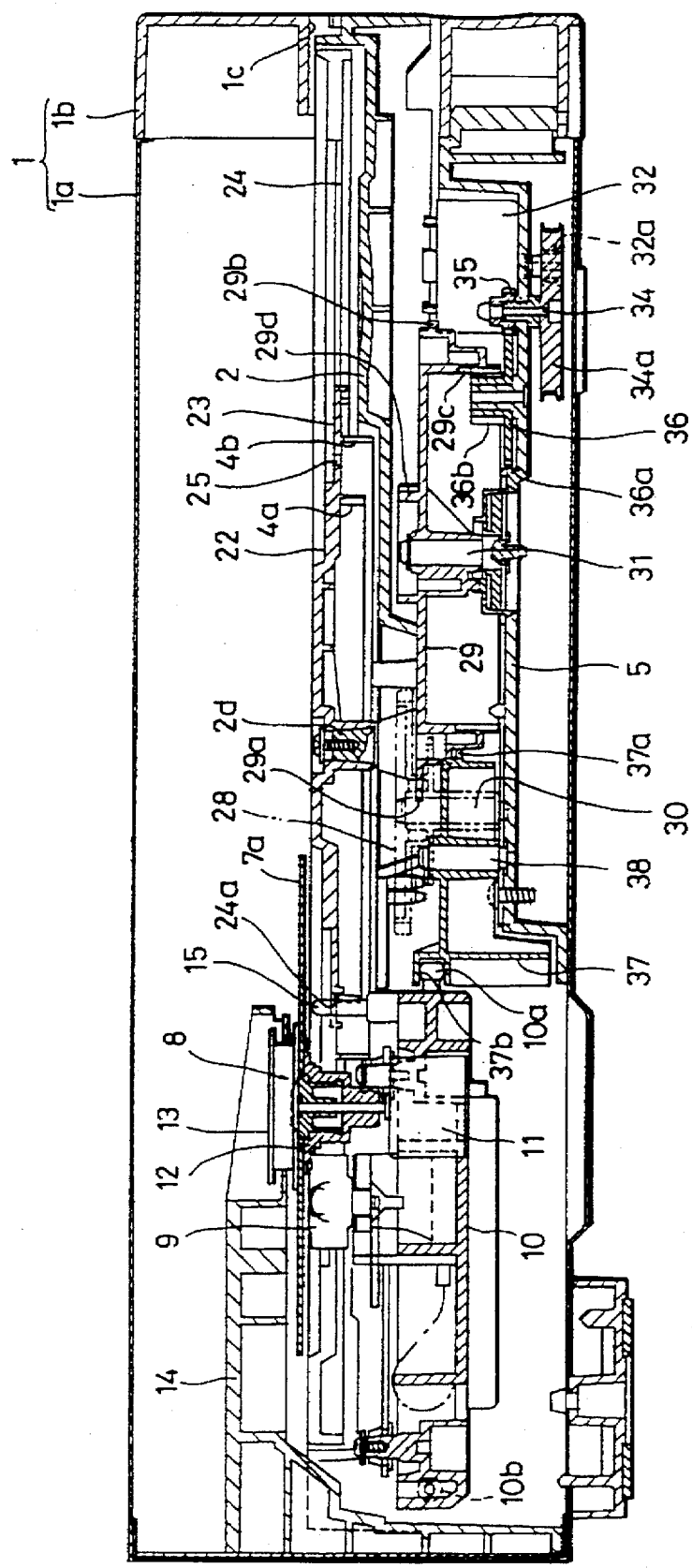
FIG. 3 is a longitudinal cross-sectional view showing a disk chucked state of the disk recording and/or reproducing apparatus shown in FIG. 1.
Figure 4:
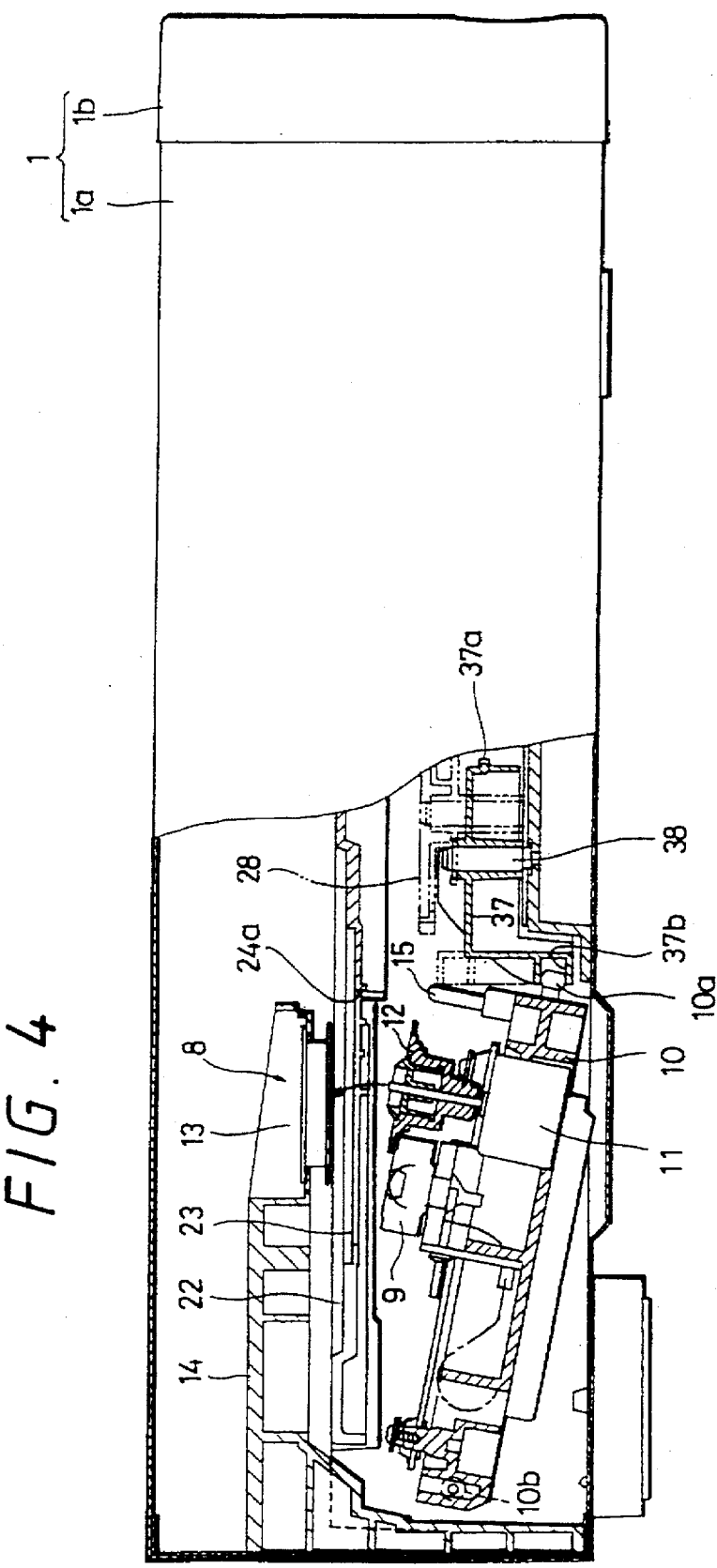
FIG. 4 is a longitudinal cross-sectional view of the main part showing a state in which the chucking of the disk shown in FIG. 3 is released.
Figure 5:
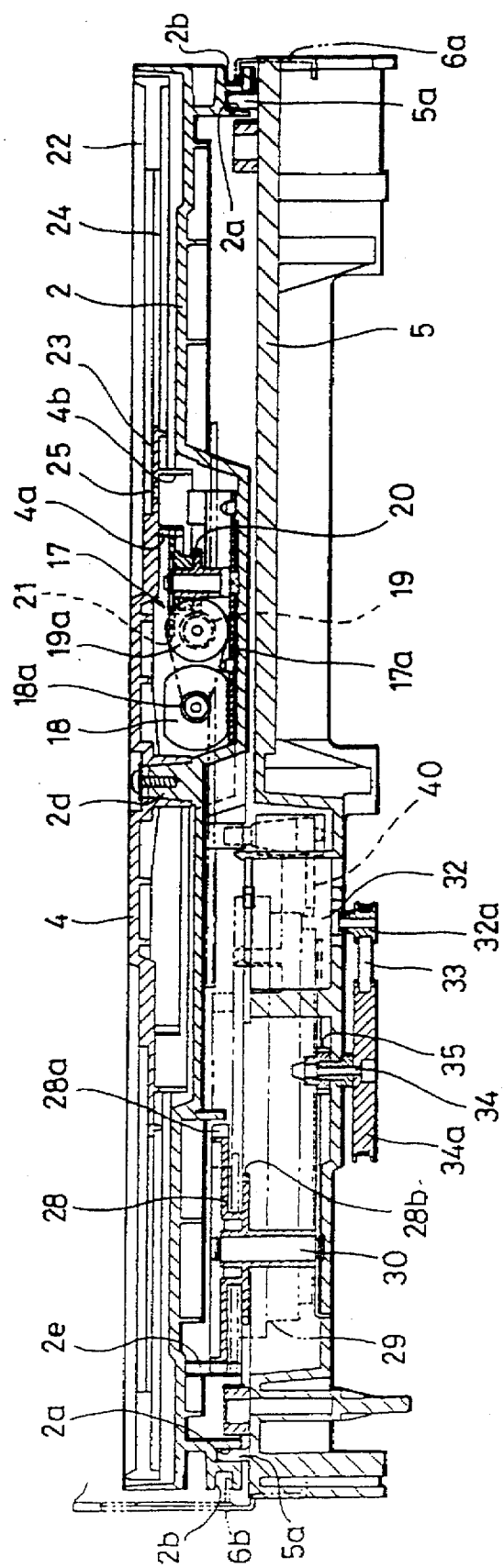
FIG. 5 is a lateral cross-sectional view showing a state in which the apparatus body is removed from the disk recording and/or reproducing apparatus shown in FIG. 1.

As shown in FIGS. 3 to 5, on a bottom surface portion of the box body 1a in the apparatus body 1, a base member 5 which is substantially same in size as the tray 2 is fixed. Guide grooves 2a and 2a extended in forward and backward directions are formed at both side portions on a lower surface of the tray 2, and guide projections 5a and 5a slidably engaged with the guide grooves 2a and 2a are formed on an upper surface of the base member 5. By engaging the guide grooves 2a and 2a and the guide projections 5a and 5a with each other as two positions, the tray 2 is arranged so that it can be linearly moved in the forward and backward directions relative to the base member 5. Reference numerals 6a and 6b represent holding pieces fitted to the base member 5. The holding pieces 6a and 6b are respectively engaged with lateral grooves 2b and 2b provided on side surfaces of the tray 2 and prevent the tray 2 from being lifted when it is drawn.

At a rear portion of the apparatus body which is located in a depth direction in which the tray 2 is inserted and ejected, there are disposed a disk rotating mechanism 8 for holding and rotating optical discs 7a and 7b and an optical pickup apparatus 9 which is a disk recording and/or reproducing unit opposed to the optical discs 7a and 7b rotated by the disk rotating mechanism 8 for reading information signals from the above-mentioned optical discs 7a and 7b. Therefore, a substantially quadrangular notch portion 2c is provided at a rear portion of the tray 2. A rocking member 10 is disposed at the notch portion 2c so that it can be attached and detached. Shaft portions 10b and 10b are projectingly provided at both sides of a rear portion of the rocking member 10, respectively. By rotatably engaging the shaft portions 10b and 10b with both sides of the notch portion 2c, the rocking member 10 is arranged so that it can be rocked in upward and downward directions relative to the base member 5.

The above-mentioned disk rotating mechanism 8 consists of a spindle motor 11 as a rotating means, a disk table 12 fitted to a driving shaft of the spindle motor 11, and a chucking plate 13 for gripping the optical discs 7a and 7b between the disk table 12 and itself. The spindle motor 11 and the disk table 12 form a disk driving unit of the disk rotating mechanism 8, and the chucking plate 13 forms a gripping portion of the disk rotating mechanism 8.

The above-mentioned spindle motor 11 is fitted to a front end side of the rocking member 10 in a state in which the driving shaft thereof is directed upward. A substantially conic concave portion is formed at a center portion of an upper surface of the disk table 12 so that the optical discs 7a and 7b can be aligned and held. The chucking plate 13 is rotatably supported by an arm bracket 14 above the disk table 12 so as to be opposed thereto. The arm bracket 14 has a substantially L-shaped longitudinal cross section and is fitted so as to be fixed at its one piece side on the rear surface of the box body 1a and developed at the other piece side in the horizontal direction. The chucking plate 13 is supported by a tip portion on the horizontal side thereof so as to be brought in a state in which it can be floated.

The above-mentioned optical pickup apparatus 9 has an optical block unit including predetermined optical devices such as a light source such as a laser diode or the like, a predetermined optical device such as a beam splitter, a collimator lens and so on, a photodetector such as a photo diode or the like, and so on and an objective-lens driving apparatus fitted to an upper surface portion of the optical block unit. The objective-lens driving apparatus supports an objective lens for focusing a luminous flux radiated from the optical block unit on signal recording surfaces of the optical discs 7a and 7b so that the objective lens can be moved. The optical pickup apparatus 9 having such construction is supported by a guide shaft 16 fitted to an upper surface portion of the rocking member 10, disposed at a rear side of the disk table 12 and arranged such that the optical pickup apparatus a can be moved in the forward and backward directions that is, directions in which it approaches the disk table 12 and is moved away therefrom. The objective lens of the optical pickup apparatus 9 is directed upward, and an optical axis of the objective lens is made substantially parallel to the driving shaft of the spindle motor 11.

The above-mentioned turntable 4 for positioning and housing plural kinds of the optical discs 7a and 7b having different diameters is disposed on the upper-surface side of the above-mentioned tray 2. The turntable 4 is formed so as to be disc-shaped and thinner than the thickness of the tray 2 and inserted into a circular concave portion formed on the upper surface portion of the above-mentioned tray 2. The turntable 4 is rotatably pivoted by a center shaft 2d provided at the center portion of the tray 2 and fitted to the above-mentioned tray 2 so that it can be rotated relative thereto. Therefore, as shown in FIG. 2 and other figures, an inner gear portion 4a is formed at an inner side portion in the radius direction of the turntable 4 over the whole of a periphery thereof in a peripheral direction, and a table rotating mechanism 17 for rotating the turntable 4 through the inner gear portion 4a is disposed near the center shaft 2d of the tray 2.

Figure 2:
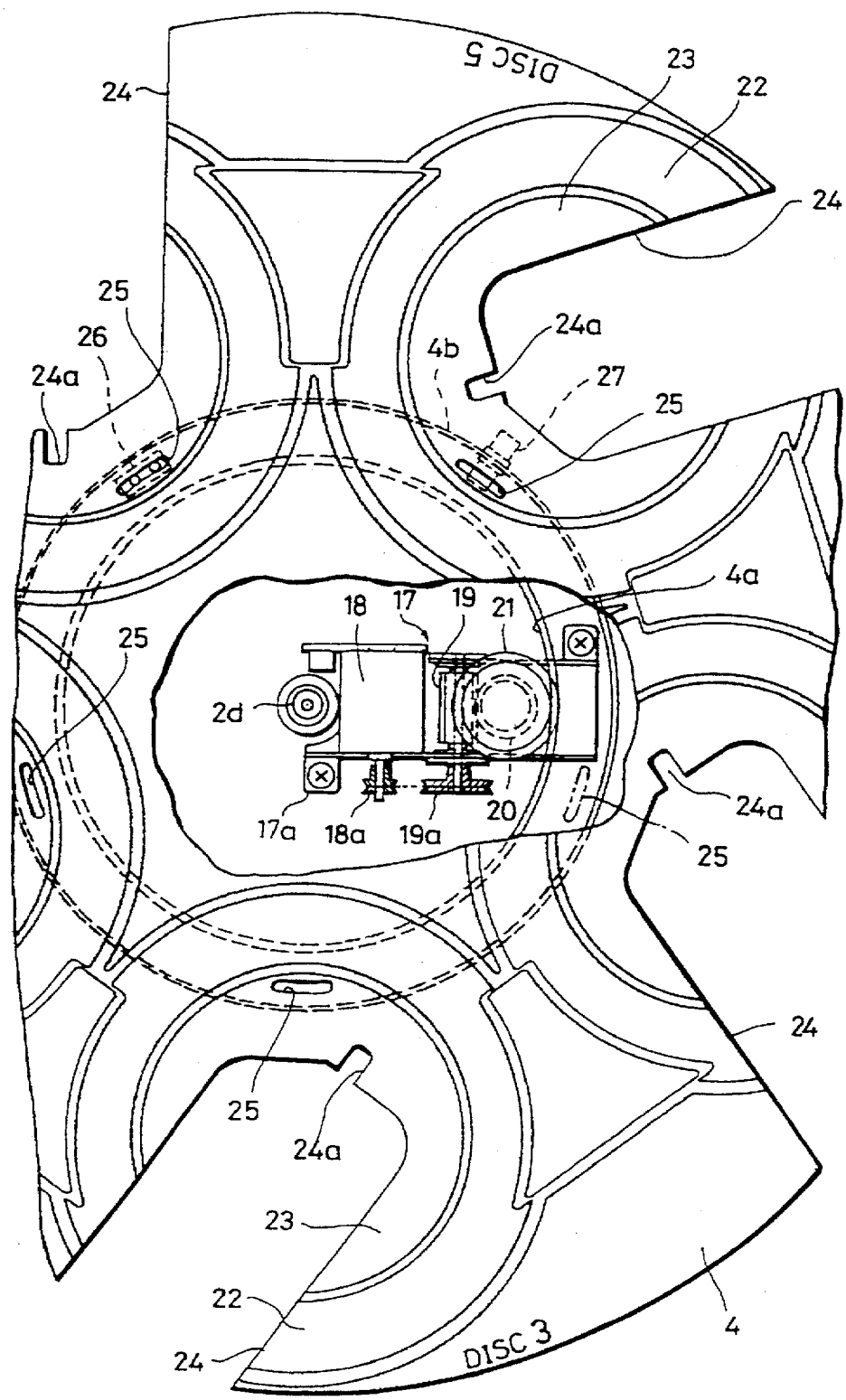
FIG. 2 is a plan view showing a main part of the turntable of a disk recording and/or reproducing apparatus shown in FIG. 1 and a table rotating mechanism thereof.

As shown in FIGS. 2 and 5, the table rotating mechanism 17 has a table rotating motor 18 with a driving pulley 18a fitted to a driving shaft thereof, a worm gear 19 to one end of which a driven pulley 19a is attached and which is connected with the driving pulley 18a through a driving belt so that driving power can be transmitted, a pinion 20 engaged with the worm gear 19, and a table rotating gear 21 which is integrally rotated together with the pinion 20 and engaged with the inner gear portion 4a of the turntable 4. The table rotating motor 18, the worm gear 19, the pinion 20 and the table rotating gear 21 are fixed on or rotatably supported by a unit plate 17a, and the table rotating mechanism 17 is mounted on the tray 2 through the unit plate 17a.

To the above-mentioned plurality of kinds of optical discs 7a and 7b, for example, an optical audio disk having a diameter of 12 cm and an optical audio disk having a diameter of 8 cm are respectively considered as the optical disk 7a having large diameter and the optical disk 7b having small diameter. In order to position and load such optical discs 7a and 7b, as shown in FIGS. 1 and 2 and other figures, a plurality of large-diameter housing portions 22 for positioning a plurality of large-diameter discs which correspond to a diameter of the optical disk 7a having large diameter are disposed on the upper surface portion of the turntable 4 at predetermined intervals along the periphery of the turntable (in the peripheral direction) on the same circumference. Further, on a bottom surface portion of each of the large-diameter housing portions 22, a small-diameter housing portion 23 for positioning a small-diameter disk which corresponds to a diameter of the optical disk 7b having small diameter is formed so as to be concentric with each of the large-diameter housing portions 22. The large-diameter housing portion 22 and the small-diameter housing portion 23 forming a pair form of a disk positioning portion.

In connection with the disk positioning portions radially disposed, the turntable 4 is provided at each of the disk positioning portions with a slit-shaped notch portion 24 used for opposing the disk table 12 to center portions of the optical discs 7a and 7b respectively positioned by the large-diameter housing portion 22 and the small-diameter housing portion 23 and for opposing the objective-lens driving apparatus of the optical pickup apparatus 9 to the signal recording surfaces of the optical discs 7a and 7b. These notch portions 24 are extended from a center portion of each of the disk positioning portions to an open end thereof at the periphery of the turntable 4 so as to be extended in the direction in which the tray 2 is inserted and ejected, that is, in the forward and backward directions of the disk recording and/or reproducing apparatus when the center portion of the large-diameter housing portion 22 and the small-diameter housing portion 23 is rotated and moved to a position above the disk rotating mechanism 8.

A slit 24a for preventing the turntable 4 from being rotated is formed at a bottom portion of each of the notch portions 24. A stopper 15 provided at a tip on the rocked side of the rocking member 10 is engaged with the slit 24a so that the former can be inserted into and detached from the latter. That is, when the turntable 4 is located at a predetermined position and the rocking member 10 is brought upward and brought in a disk chucked state, the stopper 15 is engaged with the slit 24a to thereby prevent the turntable from being rotated.

The above-mentioned stopper 15 forms a projected engaging portion, and the slit 24a forms a concave engaging portion. The stopper 15 and the slit 24a form a table locking mechanism for restricting rotation of the turntable 4. A predetermined address is previously allocated to each pair of the above-mentioned disk positioning portions. In the present embodiment, address 1 to address 5 are allocated.

In order to perform positional control of the turntable 4 or the like, there are provided on the tray 2 a disk detecting photosensor 26 as a detecting unit for detecting existence or absence of the optical discs 7a and 7b and an address detecting photosensor 27 as a detecting unit for detecting the address allocated to each pair of the large-diameter housing portions 22 and the small-diameter housing portions 23.

The disk detecting photosensor 26 detects whether or not there is the optical disk 7a or 7b in either of the large-diameter housing portion 22 and the small-diameter housing portion 23 of each of the disk positioning portion of the turntable 4. To this end, in each of the small-diameter housing portions 23 of the turntable 4, a disk detecting aperture 25 is formed therethrough so as to be positioned at an equiangular interval around the center shaft 2d, and the disk detecting photosensor 26 is disposed at a position on the side below the disk detecting aperture 25 and above the tray 2.

The disk detecting photosensor 26 has a light emitting element such as an LED or the like and a light receiving element such as a PD (photo diode) or the like and is arranged such that a reflected light of a luminous flux emitted from the above-mentioned light emitting element by an object to be detected is detected by the above-mentioned light receiving element. When the turntable 4 is located at a position of a predetermined rotational angle, that is, when any disk housing portion is located above the optical pickup apparatus 9, the photosensor 26 detects through the disk detecting aperture 25 the existence of the large-diameter optical disk 7a mounted in the large-diameter housing portion 22 or the small-diameter optical disk 7b mounted in the small-diameter housing portion 23, outputting a detection signal thereof.

The address detecting sensor 27 detects which address the large-diameter housing portion 22 and the small-diameter housing portion 23 of each of the disk positioning portions of the turntable 4 belong to. To this end, a ring portion 4b is formed at a middle portion in the radius direction on the lower surface of the turntable 4 so as to be concentric with the center shaft 2d. At the ring portion 4b of the turntable 4, there are alternately provided five address regions A1 to A5 which are first detected portions used for specifying positions of five set addresses and five number regions B1 to B5 which are second detected portions used for specifying numbers of these addresses.

Figure 19:
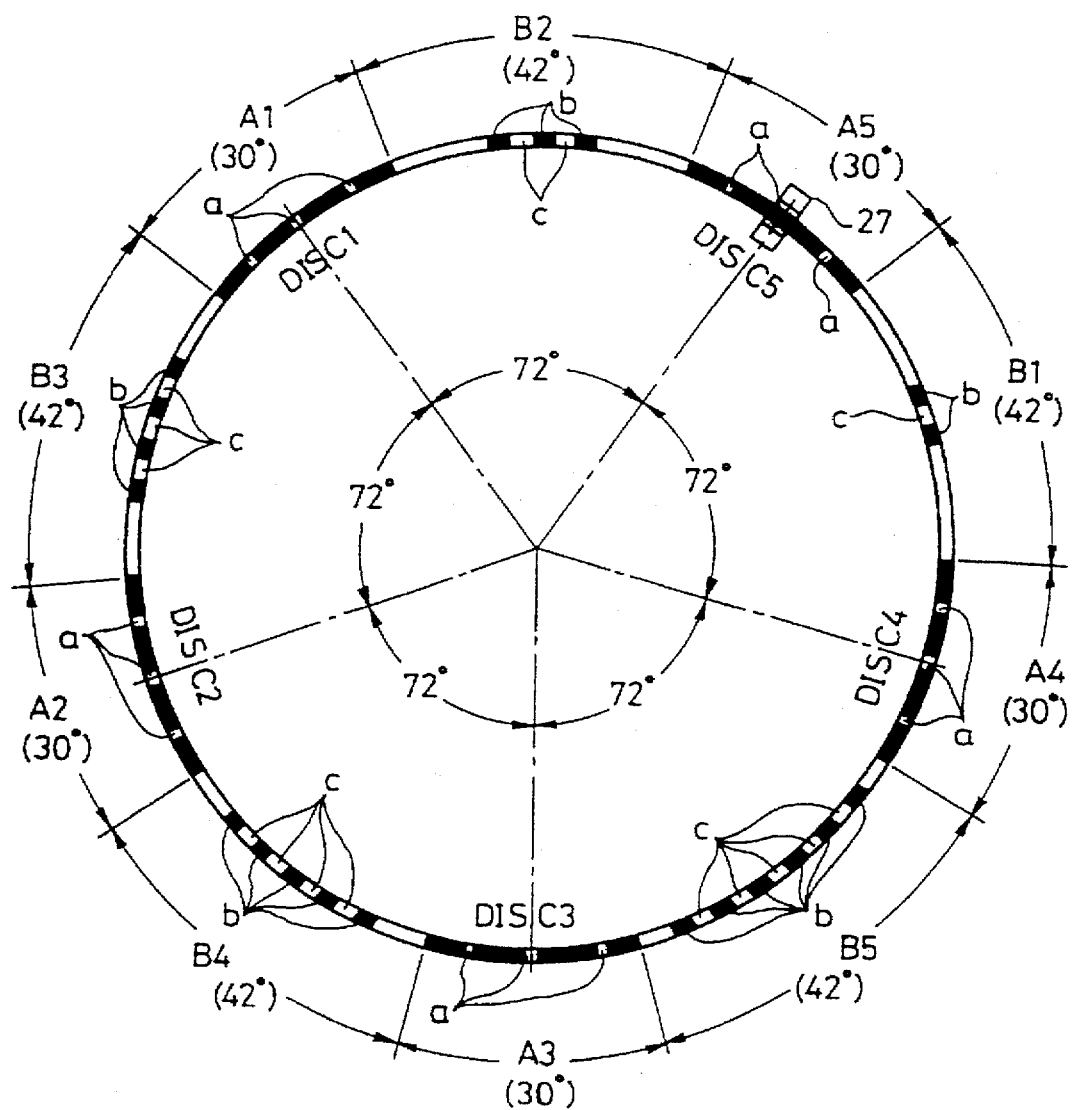
FIG. 19 is a bottom view showing one embodiment of an address region and a number region according to the present invention.
Figure 20:
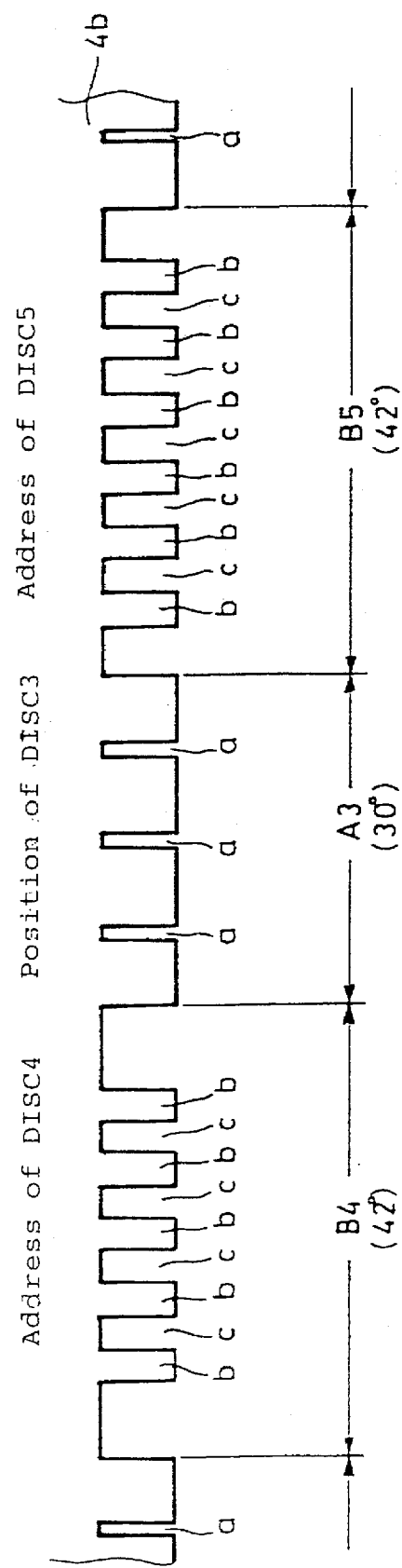
FIG. 20 is an explanatory diagram showing a part of the address region and the number region shown in FIG. 19.

As shown in FIGS. 19 to 21, the five address regions A1 to A5 are set at an interval of a constant angle (72°) in the circumference direction in such a manner that the ring portion 4b is divided into five parts. Each of the address regions A1 to A5 equally has a region of 30°. The number regions B1 to B5 are set at five positions between the adjacent address regions. Accordingly, the five number regions B1 to B5 are also set at an interval of a constant angle (72°) in the circumference direction and each of them equally has a region of 42°. As a result, a total of ten positions of the five address regions A1 to A5 and the five number regions B1 to B5 are arranged such that the centers of the respective regions divide the ring portion 4b into ten equal portions (36°). The large-diameter housing portion 22 and the small-diameter housing portion 23 of DISC1 are set on the address region A1, and those of DISC2 are set on the address region A2. Similarly, those of DISC3 to DISC5 are respectively set on the address regions A3 to A5.

Three positional slits a indicating each of the five set addresses are provided at an equiangular interval in each of the five address regions A1 to A5. Widths of the three positional slits a are set to be equal, and the center positional slit a is set at a center position of each of the address regions A1 to A5. Accordingly, the five address regions A1 to A5 are set so that the sizes of the regions and sizes and set positions of the slits provided therein should be equal to each other. Therefore, one address region cannot be discriminated from another address region using only the address regions A1 to A5. It is not necessary to set the width of the slit a positioned at the center of the three positional slits a of each of the address regions A1 to A5 equal to those of the slits a disposed at both sides thereof.

The five number regions B1 to B5 are provided with two to six address ribs b indicating numbers specified for the respective address regions A1 to A5. That is, the number region B1 indicating an address 1 corresponding to the DISC1 is provided with the two address ribs b, and a slit c having a width equal to a width of the two address ribs b is formed between the address ribs b and b. The number region B2 indicating an address 2 corresponding to the DISC2 is provided with the three address ribs b, and slits c having widths equal to a width of the adjacent address ribs b are formed between the address ribs b and b.

Similarly, the number region B3 indicating an address 3 corresponding to the DISC3 is provided with the four address ribs b. The number region B4 indicating an address 4 corresponding to the DISC4 is provided with the five address ribs b. The number region B5 indicating an address 5 corresponding to the DISC5 is provided with the six address ribs b. The slits c having widths equal to a width of the ribs b are formed between the respective adjacent address ribs b and b. As shown in FIGS. 19 to 21, the address ribs b are formed so as to be wider than the positional slits a, so that difference in width distinguishes the positional slit a and the address rib b.

Accordingly, according to the number regions B1 to B5, it is made possible not only to distinguish the five address regions A1 to A5 but also to distinguish one number region from another number regions in the number regions B1 to B5. Therefore, combination of the five number regions B1 to B5 and the five address regions A1 to A5 allows positions in the turntable 4 of the five address regions A1 to A5, which cannot be specified in position by themselves, to be concretely specified.

In comparison with the five number region B1 to B5 having the above-mentioned construction, since the turntable 4 is required to be rotated and returned to an original position from a state in which two discs can be exchanged simultaneously as will be described later on, each of the address regions A1 to A5 is set at a position displaced by 108° (72°+36°) in a clockwise direction in FIG. 19. That is, all numbers of the address regions A1 to A5 and the number regions B1 to B5 are given so as to be successively increased in a counterclockwise direction. The number region B3 is positioned at the next position on the left side of the address region A1 of the DISC1. The address region A2 of the DISC2 is positioned at the next position on the left of the number region B3. The number region B4 is positioned at the next position on the left of the address region A2. Thereafter, the address region A3, the number region B5, the address region A4, the number region B1, the address region A5 and the number region B2 are successively positioned in the counterclockwise direction.

The address detecting photosensor 27 is disposed on the tray 2 so as to grip the ring portion 4b having such address regions A1 to A5 and number regions B1 to B5. The photosensor 27 reads the number and width of the positional slits a in the address regions A1 to A5 of the ring portion 4b to detect the position of each of the address regions and similarly reads the number and width of the address ribs b in the number regions B1 to B5 of the ring portion 4b to detect the number of each in the address region. Then, the photosensor outputs the respective detection signals thereof.

The address detecting photosensor 27 has the light emitting element such as the LED or the like and the light receiving element such as the PD (photo diode) or the like and emits a light from the light emitting element to the light receiving element to thereby detect a transmitted light passed through the positional slit a and a light blocking portion in which the light is blocked by the address rib b of the ring portion 4b located between the light emitting element and the light receiving element. The address regions A1 to A5 and the number regions B1 to B5 are discriminated on the basis of difference between time in which the light is passed through the positional slit a and time in which the light is passed through the address rib b based on the detection results of the photosensor 27. The five number regions B1 to B5 can be discriminated on the basis of difference in the number of the address ribs b in the respective number regions B1 to B5 and a rotation direction of the turntable 4 can be discriminated on the basis of change of the number of the address ribs b. Accordingly, using the address detecting photosensor 27, the provided five address regions A1 to A5 and the number regions B1 to B5 are combined and the positional slit a and the address ribs b respectively formed thereat are measured as described in the present embodiment, whereby each of the five disk positioning portions of the turntable 4 can be specified and then detected.

In this case, when the address detecting photosensor 27 detects the first positional slit a regardless of whether the rotation direction of the turntable 4 is the clockwise direction or the counterclockwise direction, it can be judged that the portion thereof belongs to one of the five address regions A1 to A5. Since each of the address regions A1 to A5 is provided with the three positional slit a at an equal interval, the turntable 4 is stopped at an interval of a predetermined time after detection of the first positional slit a (or may be stopped after rotation thereof by a predetermined angle) and a stop position thereof is arranged so as to be positioned at the center positional slit set at the center of each of the address regions A1 to A5, whereby the stop position can be positioned at the center of each of the address regions A1 to A5 (at a CP4 which is a position of the DISC4 and a CP5 which is a position of the DISC5 in FIG. 21).

On the other hand, when the photosensor 27 detects the address rib b, it can be judged that the region belongs to one of the five number regions B1 to B5. Since the five number regions B1 to B5 are provided with the address ribs b of specific numbers (which is the number obtained by adding 1 to each address number in the present embodiment) respectively allocated to the above-mentioned number regions B1 to B5, the number region which is being detected can be specified in response to the rotation direction of the turntable 4 on the basis of the previous number region previously detected (if one previous number region is not detected, the number region can be specified from the next number region). Therefore, the turntable 4 is stopped at an interval of a predetermined time after detection of the first address rib b in the number region which is being detected (or may be stopped after rotation thereof by a predetermined angle) and the stop position thereof is arranged so as to be positioned at the center of the slit c or the address rib b provided at the center of each of the number regions B1 to B5, whereby the stop position thereof can be positioned at the center of each of the number regions B1 to B5 (at a CA1 of an address of the DISC1 or a CA2 of an address of the DISC2 in FIG. 21).

Combination of such address detecting photosensor 27 and the address regions A1 to A5 and the number regions B1 to B5 enables two loading systems which will be described later on, that is, an ordinary loading and a loading during reproduction to be performed by detecting the stop position of the turntable 4. When the disk is chucked in the ordinary loading, the stop positions (five positions) of the turntable 4 are detected on the basis of the positional slit a of the five address regions A1 to A5. When the discs are exchanged in the loading during reproduction, the stop position of the turntable 4 can be detected at a total of ten positions which include the stop positions (five positions) at the address ribs b of the five number regions B1 to B5 in addition to the above-mentioned stop positions.

The ordinary loading includes a series of operations in which after the turntable 4 is rotated by a predetermined angle in a predetermined direction while the tray 2 is being drawn and the disk positioning portion located at a position opposing to the optical pickup apparatus 9 is exposed in front of the main apparatus, the tray 2 is inserted into the apparatus while the turntable 4 is being rotated in a reverse direction by a predetermined angle and the above-mentioned disk positioning portion is returned to the original position opposing to optical pickup apparatus 9. In the ordinary loading operation, the optical discs 7a or 7b are set in the large-diameter housing portion 22 or the small-diameter housing portion 23 of the turntable 4 before reproduction and brought into a state in which the disk can be reproduced. The loading during reproduction includes a series of operations in which after the tray 2 is drawn during reproduction of the disk and the turntable 4 is rotated by a predetermined angle in a proper direction, the tray 2 is pushed into the main apparatus and the disk housing portion in which the disk under reproduction was housed is returned to the original position opposing to the optical pickup apparatus 9. In the operation of the loading during reproduction, the optical disk 7a or 7b can be set or the previously set optical disk 7a or 7b is exchanged for another optical disk, whereby the discs are brought into a state in which the disk can be reproduced.

In this case, since the tray 2 is supported in a cantilever fashion through a tray supporting mechanism by the main apparatus, there is then the problem that as a distance in which the above-mentioned tray 2 is drawn is made longer, a supporting force of the tray supporting mechanism is increased in response to the distance in which the tray is drawn and then the tray supporting mechanism is worn out and prevents a smooth movement of the tray from being secured, or the like. Therefore, usually the tray 2 cannot be projected to the front of the main apparatus only to an extent of a half length thereof in the forward and backward directions. Accordingly, the number of disks capable of being exchanged in the state in which the tray 2 is drawn is limited to one or two, so that if three discs or more are intended to be exchanged, then three discs or more are required to be exchanged after the turntable 4 is rotated by a proper angle in a proper direction.

If the disk positioning portions of the turntable 4 are set at five positions (positions of odd number) so as to be positioned at the constant interval as described in the present embodiment, then a middle portion between the two disk positioning portions is positioned on the opposite side of the one disk positioning portion. Therefore, a movement amount of the tray 2 upon the ordinary loading is different from that upon the loading during reproduction, so that the loading during reproduction in which the two disk positioning portions are completely exposed is larger in a projected amount of the tray 2 than the ordinary loading in which the one disk positioning portion is completely exposed.

Further, if the stop position of the turntable 4 is determined in order to exchange the two discs simultaneously (see FIG. 14), then the one disk positioning portion located on the opposite side thereof is positioned at the center in the left and right directions of the tray 2. Since the turntable 4 is disc-shaped, a length in the direction of a diameter passing through a center thereof becomes the longest. Accordingly, if the optical pickup apparatus 9 is provided at the center in the left and right directions of the tray 2 as provided in this kind of conventional disk recording and/or reproducing apparatus, then a depth of the apparatus body 1 becomes long, so that the whole of the disk recording and/or reproducing apparatus becomes large-sized.

Such extension of the depth of the disk recording and/or reproducing apparatus due to a set position of the optical pickup apparatus 9 can be suppressed to a certain degree by shifting the optical pickup apparatus 9 from the center of the left and right directions of the tray 2 toward a side thereof (to a position displaced from a movement locus of the rotation center of the turntable 4). The reason for this is that if the optical pickup apparatus 9 is shifted toward the side of the tray 2, since the turntable 4 is disc-shaped, a distance from a rear edge of the tray 2 to the center of the disk positioning portion located at a loading position can be made longer, so that the optical pickup apparatus 9 can be moved toward the front of the apparatus body 1 to an extent of a length which becomes longer.

Figure 13:
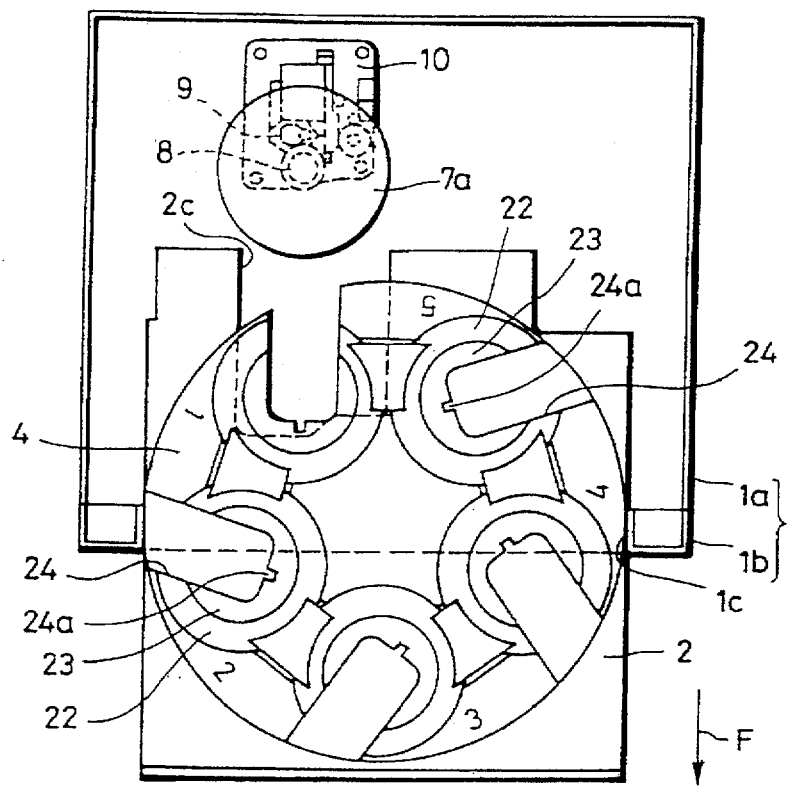
FIG. 13 is a explanatory schematic diagram showing a state an which the tray is drawn during reproduction of the disk recording and/or reproducing apparatus shown in FIG. 1.

However, when the optical pickup apparatus 9 is shifted from the center in the left and right directions of the tray 2 toward the side thereof, if the stop position of the turntable 4 is set to five positions (a resolving power is one-fifth) so as to correspond to the number of the disk positioning portions, then only one disk positioning portion is always located on the front side thereof in case of dividing the turntable into five portions, so that the two discs cannot be exchanged simultaneously when the tray 2 is drawn (see FIG. 13). Therefore, in order to shift the optical pickup apparatus 9 from the center in the left and right directions of the tray 2 toward the side thereof and enable the two discs to be exchanged when the tray 2 is drawn, the resolving power of the turntable 4 is required to be increased.

The present embodiment can satisfy such requirement, wherein ten regions of the above-mentioned five address regions A1 to A5 and the five number regions added thereto are provided at the constant interval and these regions can be individually detected by the photosensor 27, whereby the resolving power of the turntable 4 (rotation angle) can be increased from one-fifth (72°) to one-tenths (36°).

Therefore, when the tray 2 is drawn in the ordinary loading operation, it is sufficient that one positioning portion (see FIG. 13) for housing the disk to be reproduced appears at an exposed portion of the turntable 4. In such state of the turntable 4, even when the resolution power is one-fifth and the optical pickup apparatus 9 is shifted from the center in the left and right directions of the tray 2 toward the side thereof, the resolving power is set to two-fifth rotation (144°) which is an integral multiple of the resolving power of one-fifth, whereby any of the five positioning portions can be positioned at the optical pickup apparatus 9. In the ordinary loading operation, the stop position of the turntable 4 can be controlled by using only the five number regions A1 to A5.

On the other hand, in the loading operation during reproduction, when the tray 2 is drawn to a position where the tray does not disturb a reproduction operation of the disk under reproduction, if the resolving power is one-fifth and the optical pickup apparatus 9 is shifted toward the side of the tray 2, then any of the positioning portions cannot be positioned at the optical pickup apparatus 9 even by rotating the turntable 4 by the integral multiple of the resolving power of one-fifth and the turntable 4 cannot be controlled so as to be positioned at a position where two discs can be simultaneously exchanged. Accordingly, while the tray 2 cannot be inserted in such state, the stop position of the turntable 4 can be detected only by using the number regions B1 to B5 and hence the resolving power is one-tenth as shown in the present embodiment, whereby any of the five positioning portions can be positioned at the optical pickup apparatus 9. As a result, the tray 2 can be pushed in, and exchange of the discs during reproduction can be performed safely and reliably.

Accordingly, the conventional disk recording and/or reproducing apparatus in which the optical pickup apparatus is provided at the center in the left and right directions of a tray is encountered by the problem that a depth of the apparatus becomes long and hence the whole of the disk recording and/or reproducing apparatus becomes large-sized, while according to the present embodiment, the optical pickup apparatus 9 can be provided at the position displaced from the center in the left and right directions of the tray 2 toward the side thereof. As a result, the depth of the disk recording and/or reproducing apparatus can be made shorter and hence this kind of the disk recording and/or reproducing apparatus can be downsized.

It is acceptance that the accuracy of the address rib b (slit c) is less than the accuracy of the positional slit a; thus the address rib is not required to be highly accurate. That is, the five address regions A1 to A5 correspond to the five disk positioning portions by themselves. The set positions of the positional slit a thereof, especially positions of the center positional slit a of the respective address regions A1 to A5 are positioned at the disk positioning portions, so that the positional slit a need to be formed with satisfactory accuracy. On the other hand, the address rib b is a means for specifying the positions of the address regions A1 to A5 in the turntable 4 as described above and used for stopping the turntable 4 at a position where two discs can be simultaneously exchanged during reproduction of the disk, and it is sufficient that the address rib b is recognized as the address rib. Therefore, the accuracy thereof is not required to be high.

As shown in FIGS. 5 to 8, a rack portion 2e extended in the forward and backward directions is formed in the above-mentioned tray 2. A rack-side gear 28a provided in the reverse gear 28 is engaged with the rack portion 2e. A rack-side gear 29a provided in the main gear 29 as the rotating member is usually brought in a released state and arranged so as to be engaged with the rack portion 2e after the above-mentioned main gear 29 is rotated by a predetermined angle.

Figure 17:
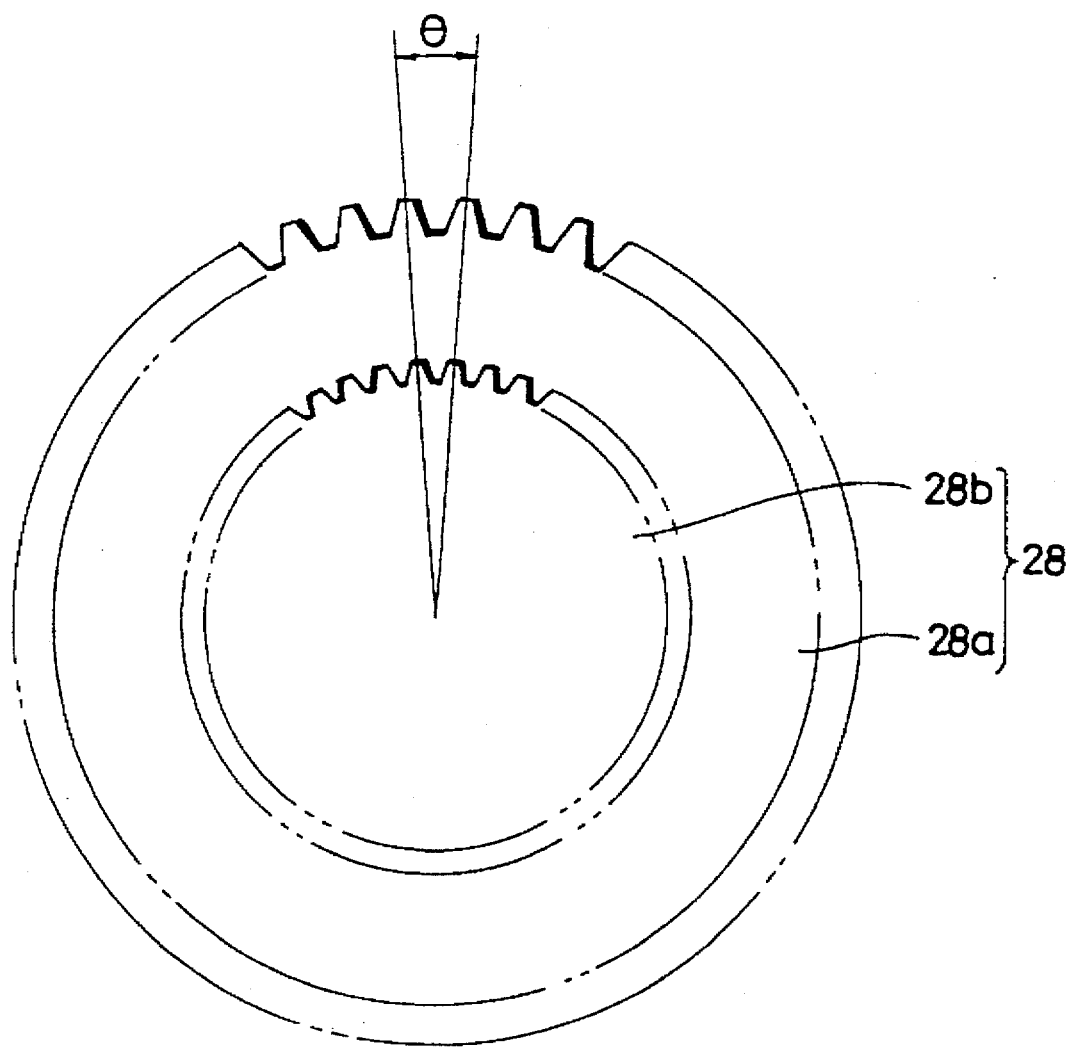
FIG. 17 is a plan view showing a reverse gear of the disk recording and/or reproducing apparatus shown in FIG. 1 with enlargement.
Figure 18:
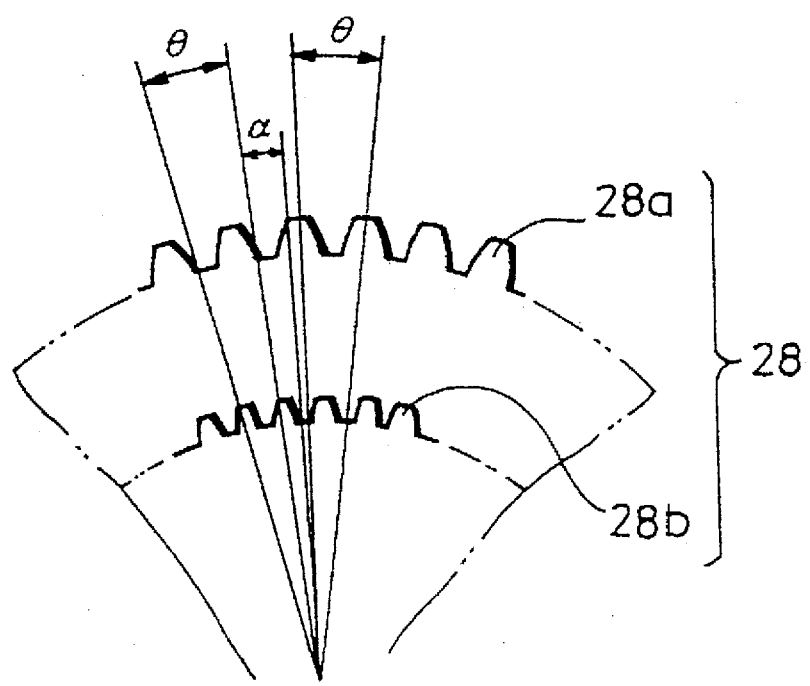
FIG. 18 is an explanatory diagram showing a main part of another embodiment of the reverse gear of the disk recording and/or reproducing apparatus shown in FIG. 1.

In the above-mentioned reverse gear 28, an input-side gear 28b which is different in a pitch circle from the rack-side gear 28a but is made similar in the number of teeth thereto by making angles θ per one tooth of both gears equal to each other is formed in the shaft direction at a predetermined interval as shown in FIG. 17 which is an enlarged diagram thereof. In order to make the angles θ per one tooth of the gears equal to each other, the input-side gear 28b is formed by making a module thereof small and hence making a size of one tooth small. A reverse-side gear 29b provided in the main gear 29 is arranged such that it is usually brought in a released state and can be engaged with the input-side gear of the reverse gear after the main gear 29 is rotated by a predetermined angle. As shown in FIG. 18, for example, the rack-side gear 28a of the reverse gear 28 and the input-side gear 28b thereof may be provided in such a manner that the teeth thereof are displaced from each other. A displacement angle α between the teeth of both of the gears 28a and 28b can be arbitrarily determined depending upon the layout of the gear to be used.

Further, the reverse gear 28 is rotatably pivoted to the base member 5 through a reverse gear pivot 30, and the main gear 29 is also rotatably pivoted to the base member 5 through a main-gear pivot 31. An inner gear portion 29c is formed on the main gear 29 over its whole periphery in the circumference direction, and a loading motor 32 which is a single driving source is connected thereto through a gear transmission mechanism engaged with the inner gear portion 29c so as to be able to transmit a driving power.

The loading motor 32 is fitted to the base member 5 in a state in which a driving shaft thereof is directed downward. A driving pulley 32a is fitted to the driving shaft thereof. The other end of a driving belt 33 whose one end is hooked around the driving pulley 32a is hooked around a driven pulley 34a fitted to one end of a supporting shaft 34 which is rotatably pivoted by the base member 5. An input gear 35 is fitted to the other end of the supporting shaft 34. The input gear 35, supporting shaft 34 and driven pulley 34a are integrally rotated. An input gear portion 36a of a mid gear 36 rotatably pivoted by the base member 5 is engaged with the input gear 35, and an output gear portion 36b integrally formed together with the input gear portion 36a is engaged with the inner gear portion 29c of the above-mentioned main gear 29.

At an upper surface portion of the main gear 29, there are provided an inner cam portion 29d formed so as to be substantially circular around the main-gear shaft 31 and a substantially arc-shaped outer cam portion 29e formed on the side of a front surface of the apparatus body 1 at a predetermined gap so as to be concentric with a part of the inner cam portion 29d. A cam convex portion 2f projecting provided on a lower surface of the tray 2 is provided between the inner cam portion 29d and the outer cam portion 29e so that it can be inserted and released. The cam convex portion 2f is extended in a direction in which the tray 2 is inserted and ejected and, in a state in which the above-mentioned tray 2 is completely housed in the apparatus body 1, located between the inner cam portion 29d and the outer cam portion 29e to prevent the tray 2 from being drawn. On the other hand, when the main gear 29 is rotated by a proper angle, the outer cam portion 29e is rotated and changed in position so as to be released from the cam convex portion 2f, whereby the tray 2 can be drawn.

Further, the main gear 29 is provided with a lifting and lowering gear 29f capable of being engaged with a gear portion 37a of a lifting and lowering member 37 which is a lifting and lowering unit. The lifting and lowering member 37 is rotatably pivoted by a lifting and lowering pivot 38 fitted to the base member 5. Further, the lifting and lowering member 37 has an inclined sliding portion 37b with which a guide projection 10a projectingly provided at the tip on the rocking side of the above-mentioned rocking member 10 is slidably engaged. The inclined sliding portion 37b is formed on the opposite side of the gear portion 37a.

In the main gear 29 as the above-mentioned rotating member, the rack-side gear 29a and the reverse-side gear 29b form a first driving unit, and the lifting and lowering gear 29f forms a second driving unit. Further, the inner cam portion 29d and the outer cam portion 29e form a locking unit. Respective end teeth 37d positioned at both ends of the gear portion 37a are set in total height higher than other teeth, whereby engagement of the main gear 29 with the lifting and lowering gear 29f becomes satisfactory.

The inclined sliding portion 37b is spirally formed around a lifting and lowering shaft 38. When the guide projection 10a is positioned at an uppermost portion of the inclined sliding portion 37b, the rocking member 10 is kept in a substantially horizontal state as shown in FIG. 3. This state is a state in which the optical disk 7a is chucked by the disk rotating mechanism 8. On the other hand, when the guide projection 10a is lowered and positioned at a lowermost portion of the inclined sliding portion 37b, the rocking member 10 is rocked downward at its front side around the shaft portion 10b projectingly provided at both rear ends thereof as shown in FIG. 4. This state is a state in which the chucking of the optical disk 7a by the disk rotating mechanism 8 is released.

It is sufficient for the above-mentioned rocking member 10 to be rocked within the above rotation range of the inclined sliding portion 37b, but the rocking member needs to be fixed at a portion except the above range. To this end, the gear portion 37a of the lifting and lowering member 37 and the lifting and lowering gear 29f of the main gear 29 engaged therewith are provided with teeth of the number necessary for moving the guide projection 10a from the uppermost end of the above-mentioned inclined sliding portion 37b to the lowermost end thereof. A column surface 29g is provided at a portion except the lifting and lowering gear 29f of the main gear 29, and arc surfaces 37c slidably brought in contact with the column surface 29g are provided at both sides of the gear portion 37a of the lifting and lowering member 37. The arc surface 37c and the column surface 29g are employed to thereby construct a mechanism for stopping rotation of the lifting and lowering member 37.

Figure 6:
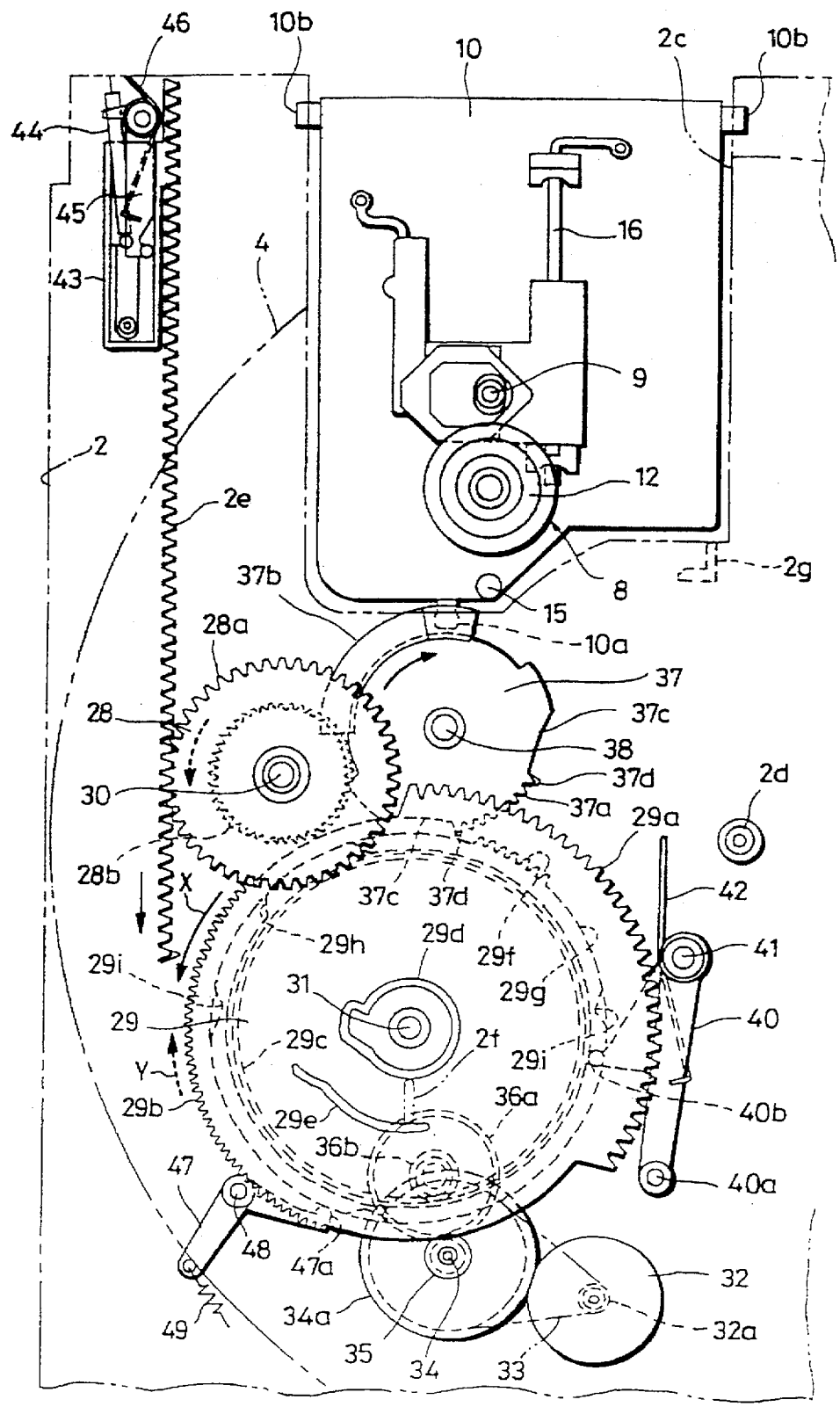
FIG. 6 is an explanatory diagram showing a loading mechanism in a loading state of the disk recording and/or reproducing apparatus shown in FIG. 1.

Reference numeral 40 shown in FIGS. 5 and 6 represents a locking lever. The locking lever 40 is fitted at its one end to the base member 5 by a supporting shaft 41 so as to be capable of being rocked and is provided at its other end with a stopper portion 40a, being extended toward the opening portion 1c of the front panel 1b. A cam input portion 40b projected toward the main gear 29 is formed at a middle portion of the locking lever 40. The cam input portion 40b is brought in contact with an outer periphery surface of the main gear 29. Reference numeral 42 represents a spring which biases the locking lever 40 to thereby press the cam input portion 40b to the main gear 29.

Figure 8:
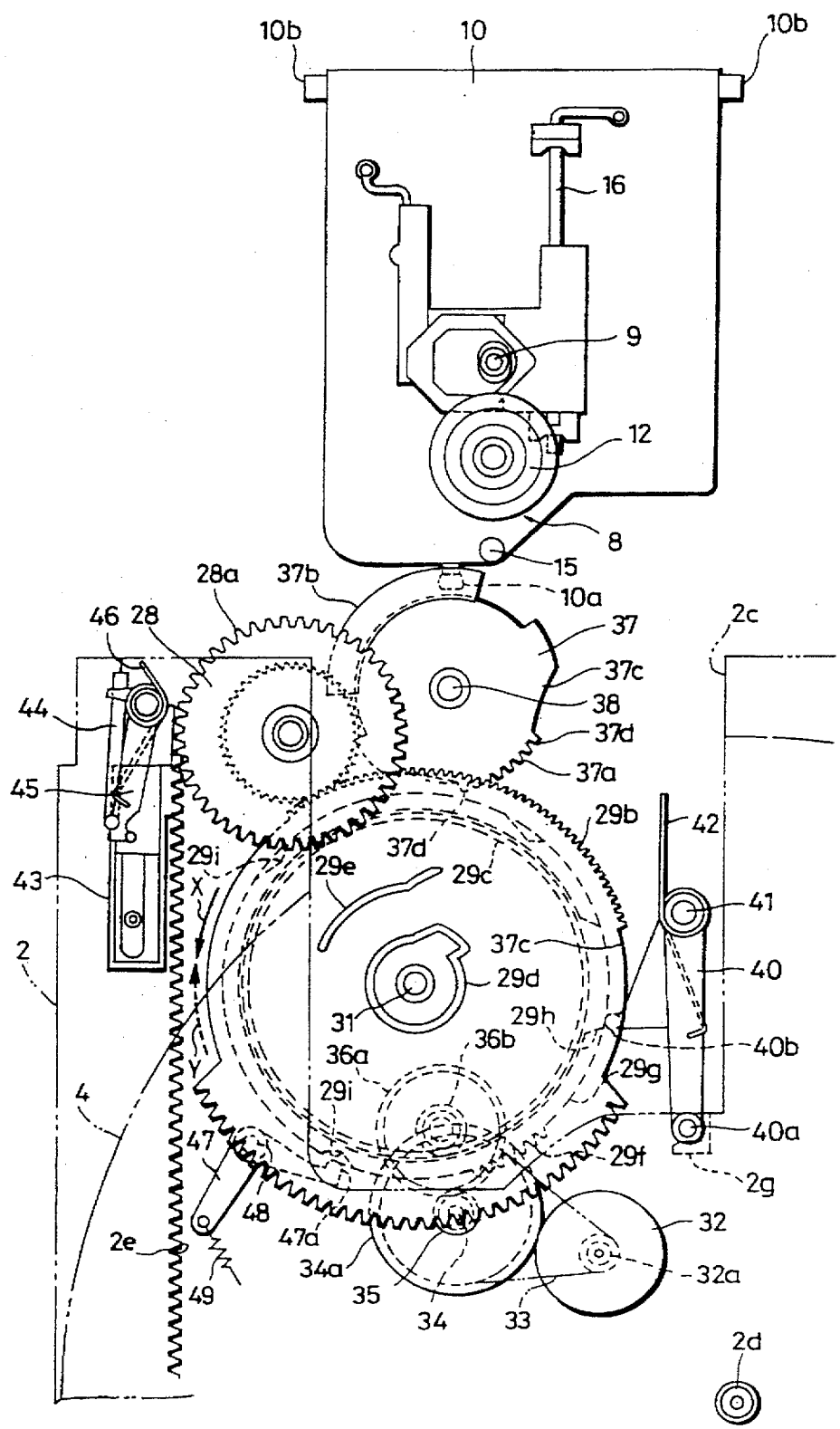
FIG. 8 is an explanatory diagram of the loading mechanism showing a state in which the tray is drawn during reproduction of the disk recording and/or reproducing apparatus shown in FIG. 1.

There is provided at the outer periphery surface of the main gear 29 a cam portion 29h which, when any of the disk housing portions of the turntable 4 is rotated and changed in position from the position corresponding to the optical pickup apparatus 9 upon the unloading, projects the stopper portion 40a at the tip of the locking lever 40 onto a moving locus of the tray 2 by pressing the cam input portion 40b. To this end, a letter-L-shaped stopper receiving portion 2g is formed on a lower surface of the tray 2. When the locking lever 40 is projected by the cam portion 29h, as shown in FIG. 8, the stopper receiving portion 2g is engaged with the stopper portion 40a to prevent the tray 2 from being inserted. The locking lever 40, the cam portion 29h of the main gear 29 and the stopper receiving portion 2g of the tray 2 construct a locking mechanism for preventing the loading upon exchange of the discs during reproduction.

In order to secure operation of the locking mechanism, a locking operation mechanism is provided in connection with the reverse gear 28 and the rack portion 2e. The locking operation mechanism has a slide gear 43 which has the same rack as the rack portion 2e and is fitted to the base member 5 so as to be capable of being slid in the forward and backward directions with a part of the above rack overlapping with an end portion of the rack portion 2e, a return spring 44 for biasing the slide gear 43 backward, a resistance lever 45 which is engaged with a projection provided on the slide gear 43 to thereby prevent the slide gear 43 from being moved in the forward and backward directions in an initial state, and a twist spring 46 which biases the resistance lever 45 toward the projection side to thereby cause a resistance force. The locking operation mechanism having such construction performs an operation to move the tray 2 forward by a rotation force of the reverse gear 28 during reproducing operation and an operation to rotate the main gear 29 in a state in which the above-mentioned tray 2 is stopped to thereby rock the locking lever 40.

In FIG. 8, when the main gear 29 is rotated in the counterclockwise direction, the cam portion 29h is brought in contact with the cam input portion 40b from the side of the opening portion 1c to draw the stopper portion 40a at the other end thereof toward the main gear 29, whereby the stopper portion 40a is retracted from the movement locus of the stopper receiving portion 2g. At this time, the disk housing portion is positioned at the substantially same position as that of optical pickup apparatus 9, so that the tray 2 can be inserted and drawn by a manual operation thereof. On the other hand, when the main gear 29 is rotated in the clockwise direction and the cam portion 29h is brought in contact with the cam input portion 40b to lift the cam input portion, the stopper portion 40a at the other end thereof is detached from the main gear 29, whereby the stopper portion 40a is moved onto the movement locus of the stopper receiving portion 2g. Accordingly, the inserting operation of the tray 2 becomes impossible.

Figure 7:
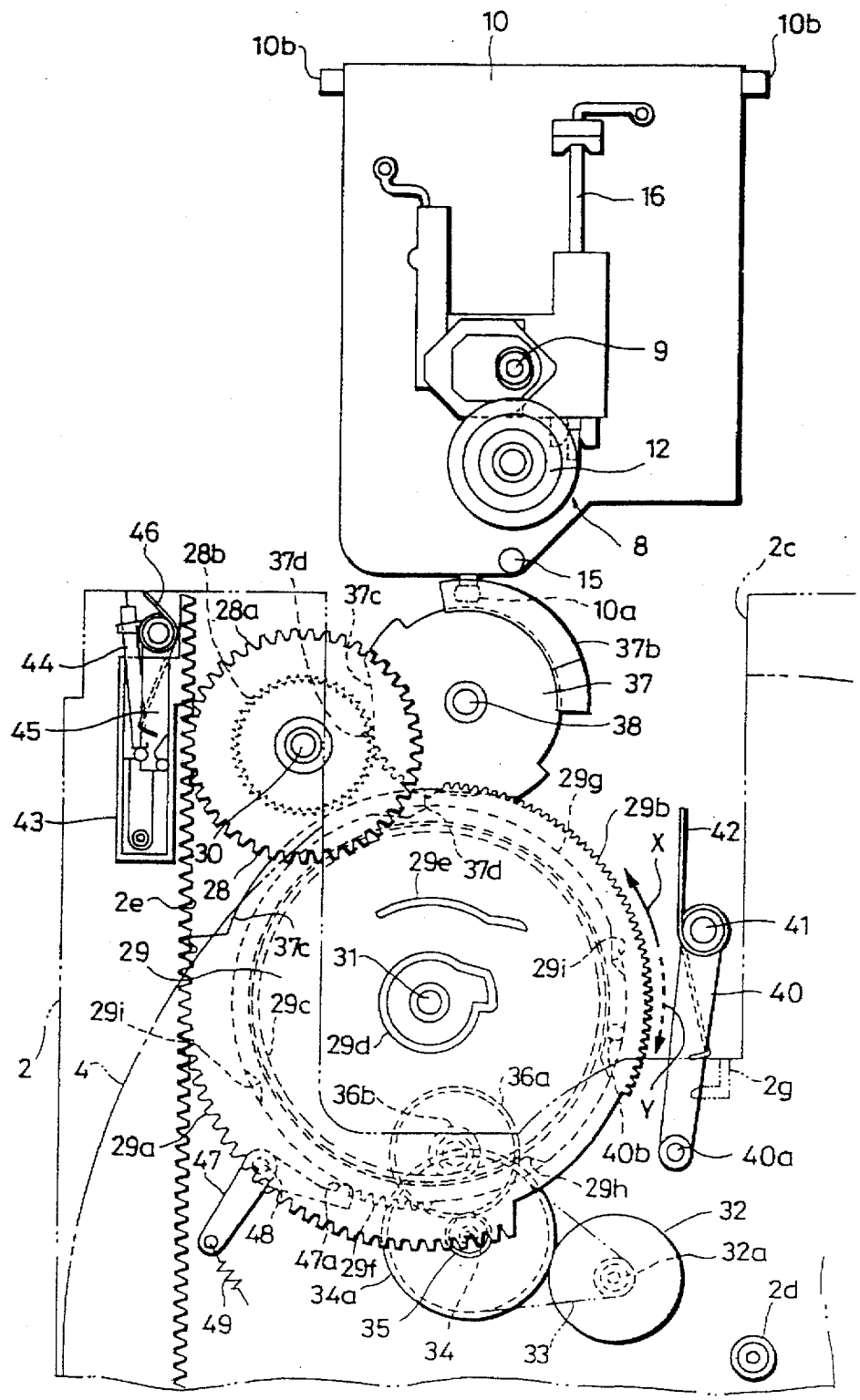
FIG. 7 is an explanatory diagram of the loading mechanism showing a state in which a tray is drawn from an ordinary loading state of the disk recording and/or reproducing apparatus shown in FIG. 1.

Reference numeral 47 shown in FIGS. 6 to 8 represents a set lever, which is pivoted to the base member 5 through a supporting shaft 48 so that it can be rocked. This set lever 47 serves to prevent a rotation of the main gear 29 by being engaged therewith when the main gear 29 comes out of the rack portion 2e upon the ordinary loading to cause a neutral point, or the like. An engaging projection 47a is formed at one end of the set lever 47. The engaging projection 47a is brought in contact with the main gear 29 by a spring 49 pulling the other end of the set lever. Three projection receiving portions 29i having V-shaped concave shapes are provided at the main gear 29 so as to correspond to the engaging projection 47a.

The rack-side gear 29a of the above-mentioned main gear 29 and the rack portion 2e of the tray 2 form a first gear train. The first gear train and the lifting and lowering member 37 form a first operating mechanism. The reverse-side gear 29b of the main gear 29, the reverse gear 28 and the rack portion 2e forms a second gear train. The second gear train form a second operating mechanism.

The disk recording and/or reproducing apparatus has a controlling apparatus which is a controlling means having a CPU (central processing unit), a RAM, a ROM (memory apparatus) or the like. Various kinds of signals from the above-mentioned disk detecting photosensor 26, the address detecting photosensor 27, the operation button 3b, the skip button 3c, and other apparatus and components are input to the controlling apparatus. On the basis of these input signals, the controlling apparatus outputs a controlling signal to the table rotating motor 18, the loading motor 32 or the like to perform disk loading, reproduction or the like as will be described later on.

In the disk recording and/or reproducing apparatus according to the present invention constructed as described above, when the large-diameter optical disk 7a housed in the large-diameter housing portion 22 of the above-mentioned turntable 4 or the small-diameter optical disk 7b housed in the small-diameter housing portion 23 thereof is reproduced, the ordinary loading operation and the loading operation during reproduction can be selectively performed.

Figure 9:
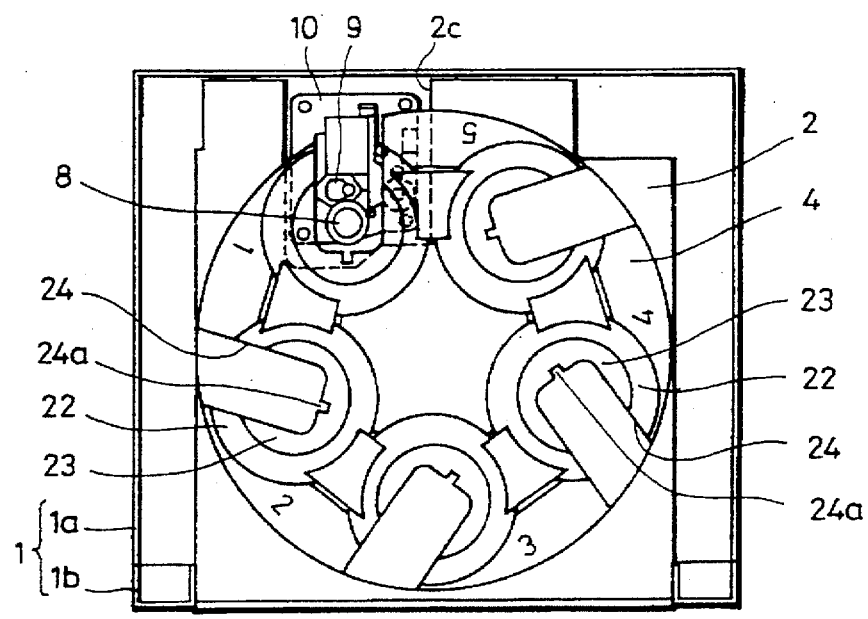
FIG. 9 is a explanatory schematic diagram showing the loading state of the disk recording and/or reproducing apparatus shown in FIG. 1.
Figure 10:
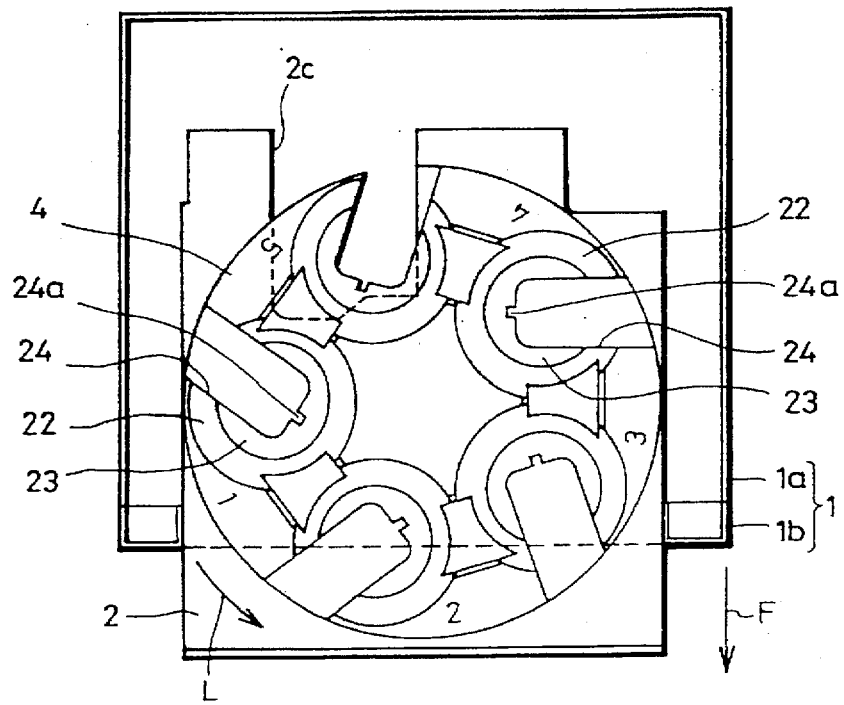
FIG. 10 is a explanatory schematic diagram showing a state in which the tray is slightly drawn from the state shown in FIG. 9.
Figure 11:
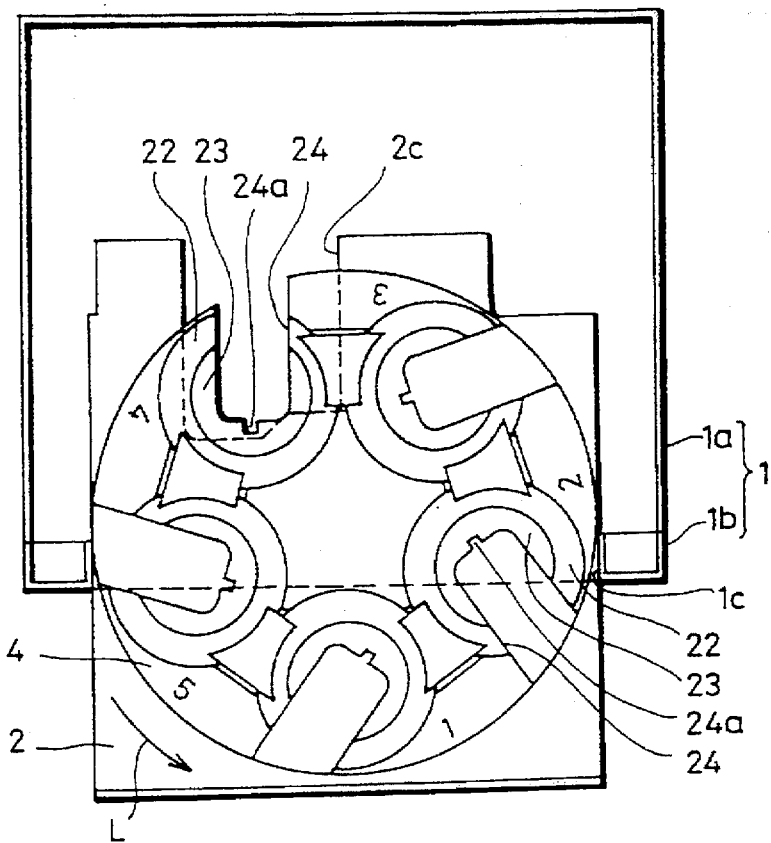
FIG. 11 is a explanatory schematic diagram showing a state in which the tray is further drawn from the state shown in FIG. 10.

As shown in FIGS. 6, 7 and 9 to 12, the ordinary loading operation can be performed by the following operation. FIG. 6 shows the loading state in which the tray 2 is completely housed in the apparatus body 1, and a schematic diagram of this state is shown in FIG. 9. FIG. 7 shows the unloading state in which the tray 2 is completely drawn from the loading state, and a schematic diagram of this state is shown in FIG. 11.

First, the power-source button 3a provided on the front panel 1b of the apparatus body 1 is turned on. A power is supplied to the present disk recording and/or reproducing apparatus and then the operation button 3b is switched on. Accordingly, a power is supplied to the loading motor 32 through operation of the controlling apparatus. The torque of the driving shaft thereof is transmitted from the driving pulley 32a through the driving belt 33 to the driven pulley 34a and then transmitted from the input gear 35 integrally rotated in the rotation direction together with the driven pulley 34a through the input gear portion 36a of the mid gear 36 and the output gear portion 36b thereof to the inner gear portion 29c and further to the main gear 29.

Therefore, the main gear 29 is rotated in the counterclockwise direction X which is the first direction in FIG. 6. First, the lifting and lowering gear 29f of the main gear 29 is engaged with the gear portion 37a of the lifting and lowering member 37 to rotate the lifting and lowering member 37 in the clockwise direction in FIG. 6 by an amount of the number of teeth thereof. As a result, the guide projection 10a of the rocking member 10 is guided by the inclined sliding portion 37b of the lifting and lowering member 37 and moved from the uppermost portion (the state shown in FIG. 3) to the lowermost portion (the state shown in FIG. 4), whereby the rocking member 10 is rocked at its front side around the shaft portion 10b, so that the optical pickup apparatus 9 mounted on the rocking member 10 is lowered and the disk table 12 of the disk rotating mechanism 8 is separated from the chucking plate 13 to release the chucking of the optical disk 7a.

Next, when the rocking member 10 is lowered to the lowermost end, engagement of the lifting and lowering gear 29f and the gear portion 37a is released and the column surface 29g of the main gear 29 is slid and brought in contact with the arc surface 37c of the lifting and lowering member 37, so that the main gear 29 is thereafter kept rotating while the lifting and lowering member 37 is stopped by the main gear 29 from being rotated to fix and hold the rocking member 10 at the lowermost position. Then, when the main gear 29 is rotated by a predetermined angle, the rack-side gear 29a is engaged with the rack portion 2e of the tray 2 to thereby move the tray 2 in the forward direction F as shown in FIGS. 7 and 10.

At this time, when the rocking member 10 is lowered, the stopper 15 projectingly provided at the tip thereof is released downward through the slit 24a provided at a bottom portion of the notch portion 24 of the turntable 4. At the same time, the table rotating motor 18 is rotated to transmit the torque of the driving shaft thereof from the driving pulley 18a through the drive belt 33 to the driven pulley 19a and then transmitted from the worm gear 19 integrally rotated in the rotation direction together with the driven pulley 19a to the pinion 20 engaged with the worm gear 19. The table rotating gear 21 is integrally fitted to the pinion 20, so that the turntable 4 is rotated in the counterclockwise direction L in FIG. 10 through the inner gear portion 4a engaged with the table rotating gear 21.

A rotation amount of the above-mentioned turntable 4 is detected by the disk detecting photosensor 26 and the address detecting photosensor 27. Since the control signal is output from the controlling apparatus on the basis of the detection signals thereof, when the turntable 4 is rotated by a predetermined amount in the counterclockwise direction L and moved by an amount of two positions to thereby bring the address 1 to the front surface as shown in FIG. 11, the above-mentioned turntable 4 is stopped from being rotated, whereby the present disk recording and/or reproducing apparatus is brought into the unloading state and hence the optical disk 7a or 7b can be loaded onto the address 1.

As described above, when one piece of optical disk 7a or 7b is intended to be reproduced in a state in which the above optical disk 7a or 7b is loaded onto the turntable 4, the operation button 3b is switched on to thereby set the apparatus in the loading state. This operation is an operation reverse to the above-mentioned unloading operation.

Figure 12:
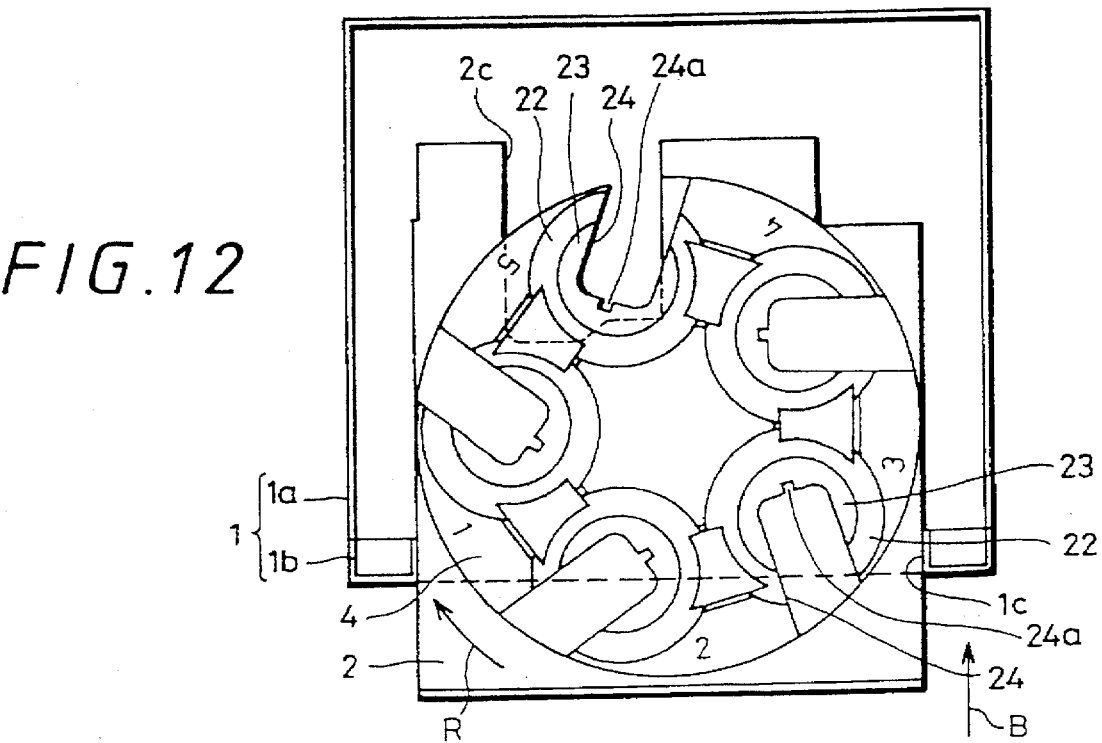
FIG. 12 is a explanatory schematic diagram showing a state in which the tray is slightly pushed from the state shown in FIG. 11 and returned to the state shown in FIG. 10.

That is, when the operation button 3b is switched on, the loading motor 32 is rotated through operation of the controlling apparatus in a direction reverse to the above-mentioned rotation to rotate the main gear 29 in the clockwise direction, whereby the torque of the main gear 29 is transmitted from the rack portion 2e to the tray 2 and this tray 2 and turntable 4 are moved in the backward direction B from the state in which they are considerably drawn as shown in FIG. 11 to be changed to the state in which they are half pulled as shown in FIG. 12. Then, the lifting and lowering gear 29f of the main gear 29 comes to be engaged with the gear portion 37a of the lifting and lowering member 37 to rotate the lifting and lowering member 37 in the counterclockwise direction.

At the same time, the table rotating motor 18 is rotated in a direction reverse to the above rotation to move the turntable 4 in the clockwise direction R which is the reverse direction by an amount of two positions to the original position where the address 1 corresponds to the optical pickup apparatus 9 at the initial position. Therefore, the rocking member 10 is lifted through the action of the inclined sliding portion 37b to chuck the optical disk 7a by the disk rotating mechanism 8, and also the optical pickup apparatus 9 is set so as to be opposed to an information recording surface of the optical disk 7a (the state shown in FIG. 3). Therefore, the loading of the present disk recording and/or reproducing apparatus is finished.

The loading during reproduction will next be explained. The loading operation during reproduction, can be performed by the following operations as shown in FIGS. 6, 8 and 13 to 16. FIG. 8 shows the unloading state in which the tray 2 is completely drawn from the loading state during reproduction, and a schematic diagram of the state is shown in FIG. 13.

Figure 14:
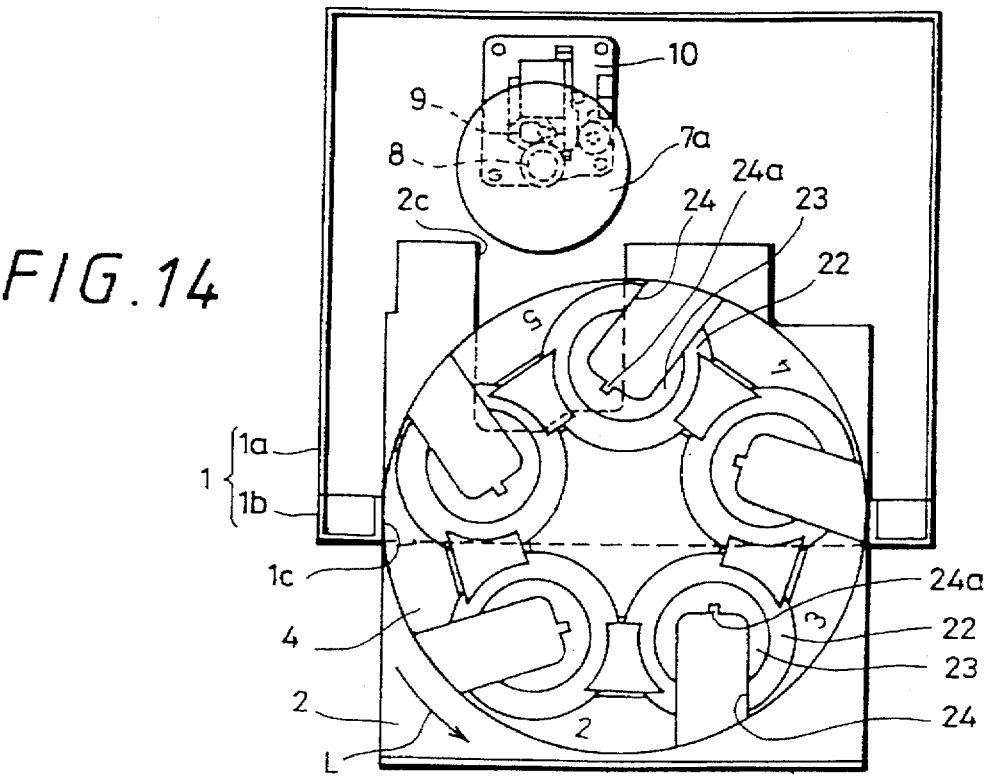
FIG. 14 is a explanatory schematic diagram showing a state in which a turntable is slightly rotated from the state shown in FIG. 13.

If the operation button 3b is switched on while the present disk recording and/or reproducing apparatus is in the reproducing state, then the loading motor 32 is rotated in the direction reverse to that of the ordinary loading on the basis of the controlling signal supplied from the controlling apparatus to rotate the main gear 29 in the clockwise direction Y which is the second direction in FIG. 6. Therefore, the reverse-side gear 29b of the main gear 29 is engaged with the input-side gear 28b of the reverse gear 28 to rotate the above-mentioned reverse gear 28 in the counterclockwise direction, whereby the tray 2 can be moved in the forward direction F through action of the rack portion 2e engaged with the rack-side gear 28a formed integrally together with the input-side gear 28b as shown in FIGS. 8 and 13. As shown in FIG. 14, the turntable 4 is rotated in the counterclockwise direction L by the table rotating motor 18 to expose the addresses 2 and 3.

As a result, the tray 2 and the turntable 4 are largely exposed at the front of the apparatus body 1, and the optical disk 7a or 7b can be loaded onto the exposed addresses 2 and 3. In this case, the main gear 29 and the lifting and lowering member 37 are individually formed to thereby have structures which allow the main gear 29 to stop the lifting and lowering member 37 from being rotated, so that an unnecessary vibration caused by rotation of the main gear 29 can be prevented from being added to the side of the rocking member 10 through the lifting and lowering member 37. Accordingly, since there is no such fear that the unnecessary vibration caused by rotation of the main gear 29 is given to the rocking member 10, the optical disk 7a or 7b can be exchanged even during reproduction without having any harmful influence on the reproduction.

As described above, according to the present embodiment, the rotation angle of the turntable 4 is controlled so that two of optical discs can be exchanged once. To this end, in the state shown in FIG. 14, the respective notch portions 24 of the addresses 1 and 5 which are the housing positions closest to a place where the disk rotating mechanism 8 and the optical pickup apparatus 9 are positioned are biased in position in the rotation direction. If the tray 2 is inserted in this state, because the rocking member 10 is lifted and brought in the reproduction state there is then the fear that the disk rotating mechanism 8 mounted on the rocking member 10 or the like will be brought in contact with the turntable 4 and hence the above disk rotating mechanism 8 or the like will be broken. In order to prevent this occurrences, the above-mentioned locking mechanism is operated.

That is, when the main gear 29 is rotated by a predetermined angle, the cam portion 29h provided in the above main gear 29 presses the cam input portion 40b of the locking lever 40 to rock the above locking lever 40 in the counterclockwise direction in FIG. 8, whereby the stopper portion 40a provided at the tip thereof is projected onto the movement locus of the stopper receiving portion 2g provided at the tray 2. Therefore, if the tray 2 is intended to be pushed in, then the stopper receiving portion 2g is brought in contact with the stopper portion 40a of the locking lever 40 to thereby prevent the above tray 2 from being pushed in. Accordingly, it can prevent the disk rotating mechanism 8 under reproduction or the like from pressing the turntable 4 in which the above disk rotating mechanism 8 or the like would be broken.

Figure 15:
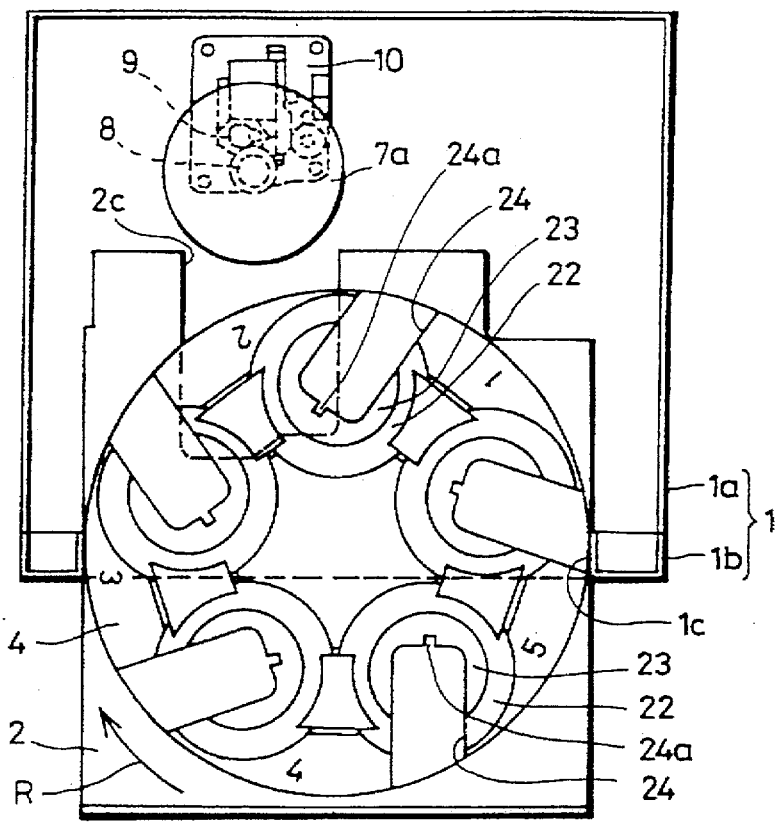
FIG. 15 is a explanatory schematic diagram showing a state an which the turntable is skippingly rotated from the state shown in FIG. 14.

When the optical disk 7a is intended to be loaded onto another vacant addresses (the addresses 4 and 5 in the present embodiment) after the optical discs 7a and 7b are exchanged as described above, the skip button 3c is switched on, whereby the turntable 4 is rotated and changed in position in the clockwise direction R (or the counterclockwise direction L) through the operation of the table rotating motor 18 based on the count of the controlling apparatus as shown in FIG. 15 to expose the vacant addresses 4 and 5. Therefore, a new optical disk can be loaded onto the vacant address, and the optical discs previously loaded onto the addresses 4 and 5 can be exchanged for other discs.

When the tray 2 is pushed in from the state shown in FIGS. 14 and 15, the operation button 3b is switched on to bring the apparatus into the loading state. This operation is an operation reverse to the above-mentioned unloading operation.

Figure 16:
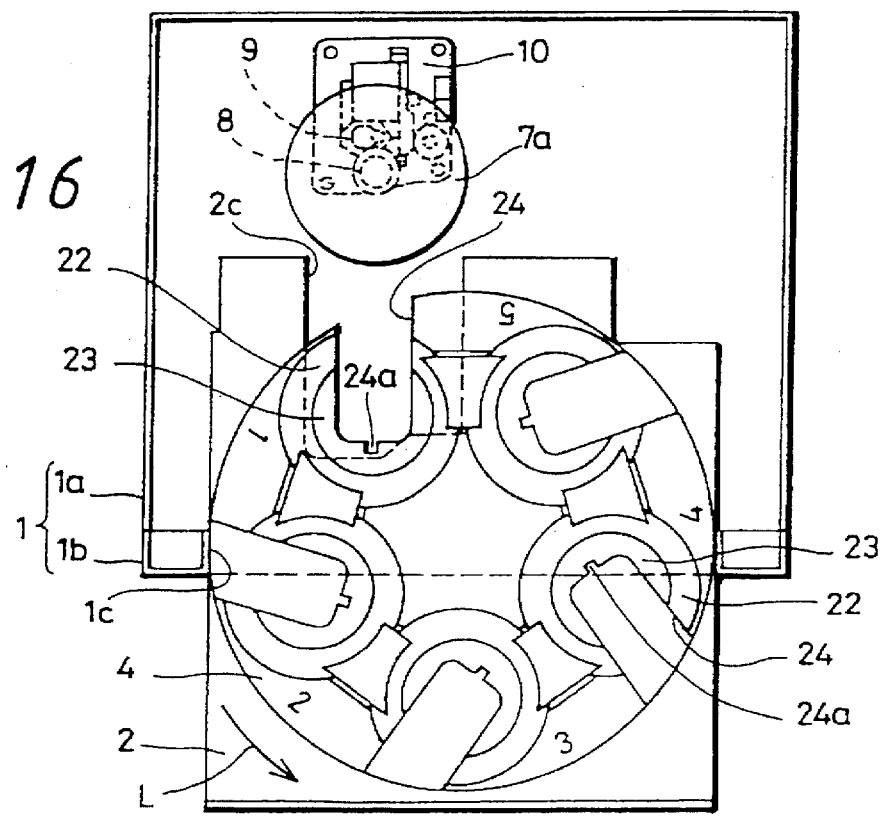
FIG. 16 is a explanatory schematic diagram showing a state an which the turntable is rotated from the state shown in FIG. 15 and then returned to the state shown in FIG. 13.

That is, when the operation button 3b is switched on, as shown in FIG. 16, the table rotating motor 18 rotates the turntable 4 through the operation of the controlling apparatus in the counterclockwise direction L which is a direction reverse to the above direction and returns the turntable to the original position shown in FIG. 13. Next, the loading motor 32 is reversed in rotation again to rotate the main gear 29 in the counterclockwise direction X, whereby the torque of the main gear 29 is transmitted from the reverse-side gear 29b to the input-side gear 28b of the reverse gear 28 and further transmitted from the rack-side gear 28a of the above reverse gear 28 through the rack portion 2e to the tray 2. As a result, the tray 2 and the turntable 4 are pushed in from the state shown in FIG. 16 in which they are largely drawn to the state shown in FIG. 9.

In the above-mentioned loading state, when the optical disk is loaded onto the large-diameter housing portion 22 or the small-diameter housing portion 23 located at the position opposing to the disk rotating mechanism 8 and so on the existence of the optical disk is detected by the disk detecting photosensor 26 and the detection signal is input to the controlling apparatus. Therefore, the controlling apparatus rotates the table rotating motor 18 to rotate the turntable 4 so that the vacant address onto which the optical disk is not loaded should be opposed to the disk rotating mechanism 8 or the like. Accordingly, in this case, the optical disk under reproduction is housed in the vacant address (the DISC1 in the present embodiment).

Since the angles θ per tooth of the rack-side gear 28a and the input-side gear 28b of the reverse gear 28 whose pitch circles are different from each other are set equal to each other, it becomes unnecessary to position the above-mentioned reverse gear 28 upon assembly thereof and hence the reverse gear 28 can be assembled at an optional position. Accordingly, it is unnecessary to take countermeasures to employ a special instrument for positioning the reverse gear 28, to make matching marks on parts and so on as required in a conventional assembling process. At whichever position the reverse gear is assembled, engagement of the rack-side gear 28a and the rack portion 2e of the tray 2 and engagement of the input-side gear 28b and the reverse-side gear 29b of the main gear 29 can always be realized with a predetermined positional relation, whereby ease of assembly can be drastically improved.

Having been explained above, the present invention is not limited to the above-mentioned embodiment. For example, while there is explained in the present embodiment the case where the respective five large-diameter housing portions 22 and small-diameter housing portions 23 for housing the optical discs 7a and 7b are provided in the turntable 4, it is needless to say that the large-diameter housing portions 22 and the small-diameter housing portions 23 may be provided at six positions or more or at four positions or less. Further, while there is explained in the above-mentioned embodiment the case where the present invention is applied to the disk reproducing apparatus, the present invention can be applied to the disk recording apparatus which records information on the disk or the disk recording and reproducing apparatus which can perform both the recording and reproduction.

As described above, various changes and modifications can be effected without departing from the spirit or scope of the present invention.

We claim:

1. A disk recording and/or reproducing apparatus comprising:
   a tray supported by an apparatus body housing a disk rotating mechanism, wherein said tray is movable between a projected position projecting from said apparatus body through an opening portion provided through said apparatus body and a housing position within said apparatus body;
   a turntable rotatably fitted to said tray and having a plurality of disk housing portions for housing a plurality of disks along a periphery thereof;
   a first operating mechanism for permitting said disk rotating mechanism to perform an operation for chucking said disk in a ganged relation with movement of said tray from said projected position to said housing position, said first operating mechanism comprising a main gear driven by a single driving source and a rotary lifting and lowering mechanism driven by said main gear for lifting and lowering a disk driving unit of said disk rotating mechanism relative to a gripping portion of said disk rotating mechanism, said main gear forming part of a first gear train;
   a second operating mechanism for moving said tray from said housing position to said projected position while said disk rotating mechanism chucks said disk, wherein said second operating mechanism is formed of a second gear train which is also driven by said single driving source, and said first gear train and said second gear train are selectively driven by changing a direction of rotation of said single driving source; and
   a rotation stopping mechanism for stopping rotation of said lifting and lowering mechanism during operation of said second operating mechanism.

2. The disk recording and/or reproducing apparatus according to claim 1, wherein said first operating mechanism comprises a reverse gear driven by said main gear for inserting and ejecting said tray and said reverse gear comprises a rack-side gear for engagement with a rack portion provided in said tray and input-side gear for engaging with a reverse-side gear provided in said main gear, being arranged such that an angle of a tooth of said rack-side gear and an angle of a tooth of said input-side gear are equal to each other.

3. The disk recording and/or reproducing apparatus according to claim 1, further comprising a locking mechanism for preventing said tray located in said projected position from being moved by said second operating mechanism to said housing position when said disk is brought in a chucked state by said disk rotating mechanism and said housing portion for housing said disk chucked by said disk rotating mechanism is rotated and changed in position.

4. The disk recording and/or reproducing apparatus according to claim 3, wherein said locking mechanism comprises said main gear rotated by said single driving source and a locking lever rocked by said main gear for being engaged with said tray.

5. A disk recording and/or reproducing apparatus comprising:
   a tray supported by an apparatus body housing a disk rotating mechanism for moving said tray between a projected position projecting from said apparatus body through an opening portion provided through said apparatus body and a housing position within said apparatus body;
   a turntable rotatably fitted to said tray and having a plurality of disk housing portions for housing a plurality of disks along a periphery thereof;
   a first operating mechanism for permitting said disk rotating mechanism to perform an operation for chucking said disk in a ganged relation with movement of said tray from said projected position to said housing position;
   a second operating mechanism for moving said tray from said housing position to said projected position while said disk rotating mechanism chucks said disk, wherein said first operating mechanism comprises a main gear forming part of a first gear train and rotated by a single driving source and a rotary lifting and lowering member driven by said main gear for lifting and lowering a disk driving unit of said disk rotating mechanism relative to a gripping portion of said disk rotating mechanism; and
   a rotation stopping mechanism for stopping rotation of said lifting and lowering member when said disk driving unit reaches a lowered position during operation of said second operating mechanism.

6. A disk recording and/or reproducing apparatus comprising:
   a disk recording and/or reproducing unit;
   a tray supported by an apparatus body housing said disk recording and/or reproducing unit for movement between a projected position projected from said apparatus body through an opening portion provided through said apparatus body and a housing position within said apparatus body;
   a turntable rotatably fitted to said tray and having a plurality of disk housing portions for housing a respective plurality of disks along a periphery thereof;
   a lifting and lowering unit for lifting and lowering said disk recording and/or reproducing unit between a lifted position where an information signal is recorded or reproduced thereby on or from a carried disk and a lowered position which is effected while said disk is carried by said tray;
   a table locking mechanism for restricting rotation of said turntable when said disk recording and/or reproducing unit is lifted by said lifting and lowering unit to said lifted position;
   a lifting and lowering unit locking mechanism for locking said lifting and lowering unit in a fixed position when said tray is moved from said housing position;
   a first motor for driving a first gear train in a first direction of rotation for moving said tray between said projected position and said housing position and for driving a second gear train in a second direction of rotation for operating said lifting and lowering unit to the lifted position; and a second motor for rotating said turntable.

7. The disk recording and/or reproducing apparatus according to claim 6, wherein said table locking mechanism comprises a projected engaging portion provided in one of said turntable and said disk recording and/or reproducing unit and a concave engaging portion provided in the other thereof.

8. A disk recording and/or reproducing apparatus comprising:
   a disk recording and/or reproducing unit having a pickup provided so that it can be moved in a radius direction of a disk;
   a tray supported by an apparatus body housing said disk recording and/or reproducing unit, wherein said tray is movable between a projected position projecting from said apparatus body through an opening portion provided through said apparatus body and a housing position within said apparatus body;
   a first motor;
   a turntable rotatable fitted to said tray and having a plurality of disk housing portions for housing a respective plurality of disks along a periphery thereof, said turntable being rotated by said first motor;
   a second motor;
   a driving mechanism including a first gear train driven by said second motor rotating in a first direction for moving said tray between said projected position and said housing position;
   a lifting and lowering unit including a second gear train driven by said second motor rotating in a second direction for lifting and lowering said disk recording and/or reproducing unit between a lifted position where an information signal is recorded or reproduced by said pickup on or from a carried disk and a lowered position which is effected while said disk is carried by said tray, wherein
   said disk recording and/or reproducing unit is disposed at a position displaced from a movement locus of a rotation center of said turntable in said apparatus body; and
   a locking mechanism for locking said lifting and lowering unit in a fixed position when said driving mechanism drives said tray from said housing position.

9. The disk recording and/or reproducing apparatus according to claim 8, wherein at a rear side of said tray, there is formed a notch portion which is so large that said pickup can be moved in a radius direction of a disk.

10. The disk recording and/or reproducing apparatus according to claim 9, wherein each of said plurality of housing portions of said turntable is formed at a position which is radially located relative to a rotation center of said turntable, a notch portion is formed along a movement locus in a disk radius direction of said housing portions and said notch portion is formed so that a longitudinal direction of said notch portion is inclined at a predetermined angle relative to a radial line whose center is said rotation center of said turntable.

11. The disk recording and/or reproducing apparatus according to claim 10, wherein said notch portion of the housing portions is formed so as to be positioned outwardly from a center of said housing portion and an outer side of said notch portion has an open end.

12. The disk recording and/or reproducing apparatus according to claim 11, wherein of said plurality of housing portions of said turntable, a longitudinal direction of a notch portion of a housing portion positioned so as to be opposed to said disk recording and/or reproducing unit is aligned with a longitudinal direction of a notch portion of said tray.

13. The disk recording and/or reproducing apparatus according to claim 9, wherein each of said plurality of housing portions of said turntable is formed at a position radially located relative to said rotation center of said turntable, a notch portion is formed along a movement locus in a disk radius direction of said pickup in each of said housing portions, and said notch portion is formed so that a longitudinal direction of said notch portion should be parallel to a moving direction of said tray between said projected position and said housing position when said tray is located at said housing position.

14. The disk recording and/or reproducing apparatus according to claim 13, wherein said notch portion is formed so as to be directed outwardly from a center of said housing portion, and an outer side of said notch portion is made so as to be an open end.

15. The disk recording and/or reproducing apparatus according to claim 14, wherein of said plurality of housing portions of said turntable, a longitudinal direction of a notch portion of a housing portion positioned so as to be opposed to said disk recording and/or reproducing unit is aligned with a longitudinal direction of a notch portion of said tray.

16. A disk recording and/or reproducing apparatus comprising:
   a disk recording and/or reproducing unit having a pickup provided so that it can be moved in a radius direction of a disk;
   a tray supported by an apparatus body housing said disk recording and/or reproducing unit, wherein said tray is moveable between a projected position projecting from said apparatus body through an opening portion provided through said apparatus body and a housing position within said apparatus body;
   a turntable rotatably fitted to said tray and having a plurality of disk housing portions for housing a plurality of disks along a periphery thereof;
   a lifting and lowering member for lifting and lowering said disk recording and/or reproducing unit between a lifted position where an information signal is recorded or reproduced by said pickup on or from a carried disk and a lowered position which is effected while said disk is carried by said tray;
   an operating mechanism including a first gear train for moving said tray between said projected position and said housing position and a second gear train for driving said lifting and lowering member and for locking said tray at said housing position;
   a locking mechanism for locking said lifting and lowering member in a fixed position when said tray is moved from said housing position;
   a first motor provided in said apparatus body for driving said first gear train in a first rotational direction and for driving said second gear train in a second rotational direction; and
   a second motor provided on said tray for rotating said turntable.

17. A disk recording and/or reproducing apparatus comprising:
   a disk recording and/or reproducing unit having a pickup provided so that it can be moved in a radius direction of a disk;

a tray supported by an apparatus body housing said disk recording and/or reproducing unit, wherein said tray is moveable between a projected position projecting from said apparatus body through an opening portion provided through said apparatus body and a housing position within said apparatus body;

a turntable rotatably fitted to said tray and having a plurality of disk housing portions for housing a plurality of disks along a periphery thereof;

a lifting and lowering member for lifting and lowering said disk recording and/or reproducing unit between a lifted position where an information signal is recorded or reproduced by said pickup on or from a carried disk and a lowered position which is effected while said disk is carried by said tray;

a loading motor;

an operating mechanism including a first gear train and a second gear train, said first gear train being driven by said loading motor operating in a first direction for moving said tray from said housing position to said projected position and for locking said lifting and lowering member in a fixed position and said loading motor operating in a second direction for moving said tray from said projected position to said housing position and driving said second gear train for moving said lifting and lowering member;

control means for issuing commands to operate said disk recording and/or reproducing unit, wherein when a command from said control means to move said tray from said housing position to said projected position is issued during the recording and/or reproduction of said information signal on and/or from said disk by said pickup, said loading motor is rotated in said first direction to thereby lock the lifting and lowering member in the lifted position and to move said tray in a direction to said projected position; and a second motor for rotating said turntable.

18. A disk recording and/or reproducing apparatus comprising:

a disk recording and/or reproducing unit having a pickup provided so that it can be moved in a radius direction of a disk;

a tray supported by an apparatus body housing said disk recording and/or reproducing unit, wherein said tray is moveable between a projected position projecting from said apparatus body and a housing position in said apparatus body through an opening portion provided through said apparatus body;

a first motor;

a turntable rotatably fitted to said tray and having a plurality of disk housing portions for housing n pieces (where n is an odd number equal to or greater than 3) of disks along a periphery thereof, said turntable rotated by said first motor;

detecting means for detecting positions of said n pieces of disk housing portions formed in said turntable;

a second motor;

a driving mechanism including first and second gear trains driven by said second motor for moving said tray between said projected position and said housing position;

a lifting and lowering unit for lifting and lowering said disk recording and/or reproducing unit between a lifted position where an information signal is recorded or reproduced by said pickup on or from a carried disk and a lowered position which is effected while said disk is carried by said tray and being driven by said second gear train and said second motor; and a locking mechanism for locking the lifting and lowering unit into a fixed position when the tray is moved from the housing position, wherein said detecting means is formed in said turntable and consists of a first detected portion used for detecting said n pieces of disk housing portions, a second detected portion used for detecting positions between adjacent disk housing portions and a detecting unit for detecting said first detected portion and said second detected portion, said disk recording and/or reproducing unit is disposed at a position displaced from a movement locus of a rotation center of said turntable in said apparatus body.

19. The disk recording and/or reproducing apparatus according to claim 18, wherein a resolving power of said first detected portion is made higher than that of said second detected portion.

20. The disk recording and/or reproducing apparatus according to claim 18, wherein said first detected portion is provided at a position corresponding to each of said housing portions, said second detected portion is provided between said adjacent first detected portions and said first detected portion and said second detected portion are alternately provided.

21. The disk recording and/or reproducing apparatus according to claim 18, wherein said apparatus is arranged such that said turntable is rotated by a predetermined angle on the basis of a detection output from said detecting unit which detected said second detected portion of said turntable upon movement of said tray to said projected position.

* * * * *